United States Patent
McMillan

(10) Patent No.: US 9,420,323 B2
(45) Date of Patent: Aug. 16, 2016

(54) METHODS AND APPARATUS TO VERIFY AND/OR CORRECT MEDIA LINEUP INFORMATION

(71) Applicant: The Nielsen Company (US), LLC, Schaumburg, IL (US)

(72) Inventor: F. Gavin McMillan, Tarpon Springs, FL (US)

(73) Assignee: The Nielsen Company (US), LLC, New York, NY (US)

( * ) Notice: Subject to any disclaimer, the term of this patent is extended or adjusted under 35 U.S.C. 154(b) by 150 days.

(21) Appl. No.: 14/473,639

(22) Filed: Aug. 29, 2014

(65) Prior Publication Data
US 2015/0181269 A1 Jun. 25, 2015

Related U.S. Application Data

(60) Provisional application No. 61/918,513, filed on Dec. 19, 2013.

(51) Int. Cl.
*H04H 60/32* (2008.01)
*H04N 21/2668* (2011.01)
(Continued)

(52) U.S. Cl.
CPC ...... *H04N 21/2668* (2013.01); *G06F 17/30424* (2013.01); *H04N 21/23418* (2013.01);
(Continued)

(58) Field of Classification Search
CPC ............... H04N 21/2668; H04N 21/44222; H04N 21/4524; H04N 21/431; H04N 21/2407; H04N 21/44008; H04N 21/23418; G06F 17/30424
USPC ............... 725/14, 19, 34, 35, 38, 50
See application file for complete search history.

(56) References Cited

U.S. PATENT DOCUMENTS

| 4,230,990 A | 10/1980 | Lert, Jr. et al. |
| 4,677,466 A | 6/1987 | Lert, Jr. et al. |

(Continued)

FOREIGN PATENT DOCUMENTS

| EP | 1264481 B1 | 5/2012 |
| WO | 01/52173 A1 | 7/2001 |

(Continued)

OTHER PUBLICATIONS

Patent Cooperation Treaty, "International Search Report," issued in connection with Application No. PCT/US2014/068141, Feb. 24, 2015, 3 pages.

(Continued)

*Primary Examiner* — Nnenna Ekpo
(74) *Attorney, Agent, or Firm* — Hanley, Flight & Zimmerman, LLC

(57) ABSTRACT

Methods and apparatus to verify and/or correct media lineup information are disclosed. An example method includes comparing presentation data representative of media output by a first set top box (STB) to reference data corresponding to a first station to determine whether the media presentation data corresponds to the reference data, the presentation data collected while the first STB was tuned to a first channel. The method further includes determining a second station that corresponds to the presentation data when the presentation data does not correspond to the reference data. The method further includes correcting a first channel map that relates the first channel to the first station by relating the first channel to the second station to create a second channel map, and correcting clickstream data that represents commands to other STBs using the second channel map.

28 Claims, 11 Drawing Sheets

(51) Int. Cl.
*G06F 17/30* (2006.01)
*H04N 21/442* (2011.01)
*H04N 21/45* (2011.01)
*H04N 21/24* (2011.01)
*H04N 21/44* (2011.01)
*H04N 21/234* (2011.01)

(52) U.S. Cl.
CPC ..... *H04N21/2407* (2013.01); *H04N 21/44008* (2013.01); *H04N 21/44222* (2013.01); *H04N 21/4524* (2013.01)

(56) References Cited

U.S. PATENT DOCUMENTS

| | | |
|---|---|---|
| 5,093,921 A | 3/1992 | Bevins, Jr. |
| 6,718,551 B1 | 4/2004 | Swix et al. |
| 7,139,723 B2 | 11/2006 | Conkwright et al. |
| 7,146,329 B2 | 12/2006 | Conkwright et al. |
| 7,194,421 B2 | 3/2007 | Conkwright et al. |
| 7,197,472 B2 | 3/2007 | Conkwright et al. |
| 7,236,941 B2 | 6/2007 | Conkwright et al. |
| 7,302,419 B2 | 11/2007 | Conkwright et al. |
| 7,383,243 B2 | 6/2008 | Conkwright et al. |
| 7,729,940 B2 | 6/2010 | Harvey et al. |
| 7,934,227 B2 | 4/2011 | Gray et al. |
| 8,000,993 B2 | 8/2011 | Harvey et al. |
| 8,224,662 B2 | 7/2012 | Matz et al. |
| 8,224,894 B1 | 7/2012 | Parks et al. |
| 8,311,885 B2 | 11/2012 | Kennedy et al. |
| 2003/0172374 A1 | 9/2003 | Vinson et al. |
| 2005/0132419 A1 | 6/2005 | Gray et al. |
| 2006/0075420 A1 | 4/2006 | Ludvig et al. |
| 2007/0180488 A1 | 8/2007 | Walter et al. |
| 2007/0294729 A1 | 12/2007 | Ramaswamy |
| 2008/0077951 A1 | 3/2008 | Maggio et al. |
| 2008/0098427 A1 | 4/2008 | Kim |
| 2009/0228925 A1 | 9/2009 | Luu et al. |
| 2010/0115573 A1 | 5/2010 | Srinivasan et al. |
| 2011/0078572 A1 | 3/2011 | Milazzo |
| 2012/0278179 A1 | 11/2012 | Campbell et al. |
| 2012/0278330 A1 | 11/2012 | Campbell et al. |
| 2012/0278331 A1 | 11/2012 | Campbell et al. |
| 2013/0268971 A1 | 10/2013 | DeLaCruz et al. |

FOREIGN PATENT DOCUMENTS

| | | |
|---|---|---|
| WO | 03/052667 A1 | 6/2003 |
| WO | 2010081247 A1 | 7/2010 |

OTHER PUBLICATIONS

Patent Cooperation Treaty, "Written Opinion of the International Searching Authority," issued in connection with Application No. PCT/US2014/068141, Feb. 24, 2015, 4 pages.

Myles Glenn Megdal, "Best Practices in Matching Databases to Set-Top Box Data", Coalition for Innovative Media Measurement, Jun. 2011 (65 pages).

Kerschbaumer, "Who's Really Watching?" May 16, 2005, 4 pages, Broadcasting & Cable.

```
Begin {                                                              400
    Transmit 1; //tune to channel 1              ← 418
    x = 1;  // set array storage location        ← 420
    channel = 1; // set current channel variable ← 422
    collectMediaPresentationData();              ← 424

Transmit 1;                                  ← 426
    Transmit 0; //channel 10                     ← 428
    channel = 10; // set current channel variable ← 430
    x = 10001; // set array storage location     ← 432
    collectMediaPresentationData();              ← 434 while getCurrentTime() =! 12:05:00 P.M.  ← 436
          do nothing;
    Transmit ChannelUp; //channel 11             ← 438
    channel++;    // set current channel variable ← 440
    x = 11001;    // set array storage location  ← 442
    collectMediaPresentationData();              ← 444
    ...
    Transmit volumeUp;                           ← 452
    Transmit volumeDown;                         ← 454
    Transmit Guide;                              ← 456
    Transmit Pause;                              ← 458
    ...
    mediaPresentationData = new Document(); // create report document    ← 446
    mediaPresentationData = signatureArray[ ] + watermarkArray[ ]; // add ← 448
          signatures and watermarks to report document
    transmit(clickstreamProcessingSystemAddress) mediaPresentationData; // ← 450
          transmit report document to Clickstream Processing System end;                                                            402
}
collectMediaPresentationData() {
          for t = x; t++; t < (x+1000) { // 1000 loops = 2 minutes of data   ← 404
                a = read sensor(); //collect media signal             ← 406
                time = getCurrentTime();                              ← 408
                watermark = extractWatermark(); // extract            ← 410
                      watermark from media signal
                signature = generateSignature(); // generate          ← 412
                      signature of media signal
                signatureArray[t] = signature+time+channel            ← 414
                watermarkArray[t] = watermark+time+channel            ← 416
          }
          return;
}
```

FIG. 4

METHODS AND APPARATUS TO VERIFY AND/OR CORRECT MEDIA LINEUP INFORMATION

RELATED APPLICATION

This patent claims priority to U.S. Provisional Patent Application No. 61/918,513, filed Dec. 19, 2013. The entirety of U.S. Provisional Patent Application No. 61/918,513 is incorporated herein by reference.

FIELD OF THE DISCLOSURE

This disclosure relates generally to audience measurement, and, more particularly, to methods and apparatus to verify and/or correct media lineup information.

BACKGROUND

Television measurement has traditionally been performed using methods such as having panelists keep a log or diary of television viewing and/or using physical meter devices to detect television usage in an automated fashion.

BRIEF DESCRIPTION OF THE DRAWINGS

FIG. 4 is pseudocode representative of an example script to generate media presentation data to verify and/or correct clickstream data.

The figures are not to scale. Wherever appropriate, the same reference numbers will be used throughout the drawing(s) and accompanying written description to refer to the same or like parts.

DETAILED DESCRIPTION

Figure 1:
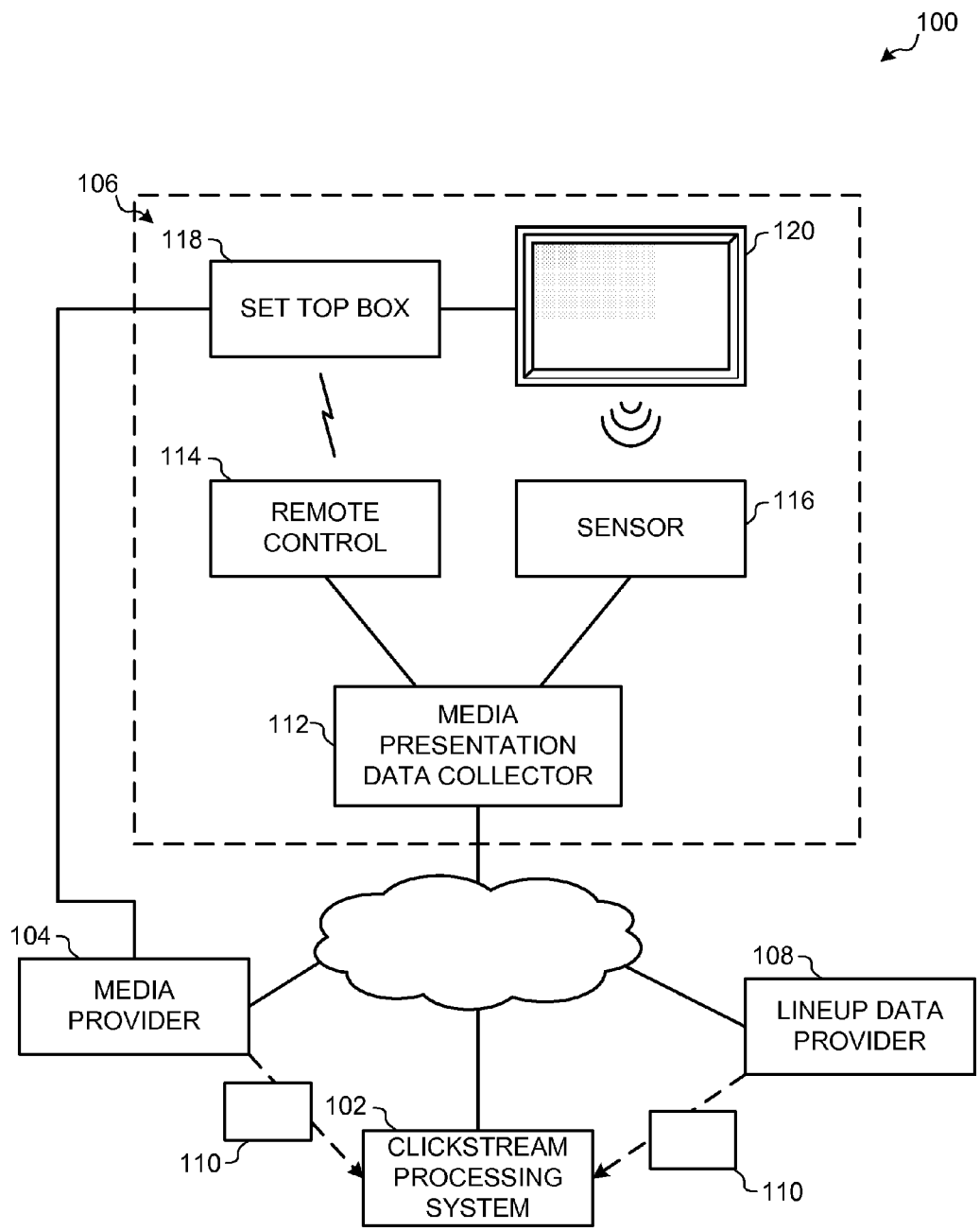
FIG. 1 illustrates an example system to verify and/or correct clickstream data.

Television exposure and/or consumption can be measured using return path data from cable television set top boxes. Return path data, also referred to herein as clickstream data, is data that indicates what channel is being viewed by a set top box in a home and the date and time of tuning. The return path data for a set top box may include interaction information (e.g., commands received by the set top box, timing of the commands) and/or status information (e.g., channel tuned by the set top box). Using return path data to perform audience measurement has a relatively low cost to obtain tuning data for a large portion of the population. However, return path data can cause erroneous results unless the data is monitored and corrected. By monitoring return path data and providing corrections to the crediting component of the system, return path data can provide accurate tuning information. Additionally, because return path data or clickstream data is not necessarily associated with demographic or other characteristic information describing the audiences, demographic and/or other characteristic information is determined using other measurement methods, such as surveys, and applied to the audience data.

A media provider (e.g., cable operator, satellite operator, multi-source operator, radio station, etc.) provides a selection of viewing choices or channels to subscribers. Viewing choices include networks and/or stations. A media provider assigns networks and/or stations to discrete channels. For example, a media provider may assign channel position 3 to the (geographically) local ABC affiliate station and assign channel 4 for the (national) TNT network. However, different media providers may assign the networks and/or stations to different channels, and/or the same media provider may assign the networks and/or stations to different channels in different geographic areas.

Lineup information (e.g., a channel lineup) for a media provider includes the assignment of each network and/or station to a respective channel. The lineup information can be provided by the media provider, or by a third party such as Tribune Media Services. In some examples, the lineup information includes media identifiers (e.g., program titles, media identification numbers, etc.) for programming scheduled to be presented on each of the channels and the times at which the programming is scheduled to be presented. In some cases, a media provider may change its channel lineup for one or more subscribers (e.g., in a particular geographic area) and/or re-organizing geographic areas and/or channel lineups without notifying the appropriate entities of such changes (or informing such entities at a later time). Example methods and apparatus disclosed herein may use the media identifiers to verify the lineup information.

In some examples, a validation site is used to generate media presentation data to verify that the channel mappings associated with return path data are accurate. Based on the monitoring at a verification site, example methods and apparatus disclosed herein monitor clickstream data (or return path data) from a media provider and/or correct the clickstream data.

In some examples, a validation site includes a media presentation device (e.g., a television), a set top box, and a media presentation data collector equipped to send remote control commands to tune the set top box. Example methods and apparatus disclosed herein provide the media presentation data collector with a script to 1) tune the set top box based on the channel lineup of a media provider and 2) collect media presentation data (e.g., signatures and/or watermarks) from the media presentation device associated with the set top box. Each channel available from the media provider is tuned for an amount of time while media signals (e.g., audio and/or video signals) and/or media presentation data (e.g., signatures, codes, and/or other metadata) are collected from the channel (e.g., via output from the media presentation device). In some examples, non-tuning commands are also issued to the set-top box, such as volume changes, guide display commands, mute command, etc.

In examples disclosed herein, media presentation data collectors receive media signals from the media presentation device (e.g., a television). For example, the media presentation data collector includes a microphone or other audio capture device to receive free field (e.g., ambient) audio output by the media presentation device. Example methods and apparatus disclosed herein may use any method(s) to identify the tuned channel and/or media, such as matching audio signatures to reference signatures (e.g., to identify media presented at a particular time, which may subsequently be matched to a channel and a station and/or network using a program schedule) and/or decoding audio watermarks (e.g., to obtain a code identifying a network and/or station).

The media presentation data is sent to a clickstream processing system in near real-time and/or at some periodic or aperiodic interval. In some examples, in addition to receiving the media presentation data, methods and apparatus disclosed herein receive the clickstream data (or return path data) associated with the set top box employed at the validation site (e.g., a validation set top box). Example methods and apparatus determine whether the clickstream data for the validation set top box is consistent with the script (e.g., tuning and/or non-tuning channels). For example, the clickstream data for the validation set top box may be compared to the commands programmed in the script to verify that an indication in the clickstream that a given command (e.g., command A) (or sequence of commands) that occurred (e.g., at a particular time) is the same command (or sequence of commands) that was to be sent to the validation set top box according to the script (e.g., for the same time).

In some examples, the non-tuning commands executed in the script are validated against meter data. For example, when the mute key is engaged for a duration specified in the script, no audio signals should be received at the sensor. Example methods and apparatus disclosed herein also validate trick mode commands such as pause, fast forward and reverse.

After verifying the media presentation data and/or the clickstream data from the verification site, example methods and apparatus disclosed herein verify and/or correct lineup information supplied by the media provider and/or by a third party. For example, based on the script and the channel lineup information, example methods and apparatus disclosed herein verify each discrete channel to confirm that the station or network available on that channel matches what the lineup information indicates. For channels that do not match the lineup information, some example methods and apparatus disclosed herein correct the channels in the lineup information. In some examples, the verification and/or correction includes comparing codes extracted at the verification site to known codes (e.g., watermarks) of networks and/or stations. Additionally or alternatively, the verification and/or correction includes comparing signatures representative of media presented at the verification site to reference signatures of reference media, identifying the media based on the comparisons, and using a program schedule to determine a channel, network, and/or station on which the identified media is scheduled to be presented.

Example methods and apparatus disclosed herein generate reports including discrepancies identified in channel lineup information and/or disagreement between clickstream data commands and scripted commands. After identifying and/or correcting identified discrepancies in the lineup information, example methods and apparatus disclosed herein use the lineup information to perform crediting using the clickstream data and/or to apply corrections to the crediting process. For example, where channel lineup information indicated that the TNT network should be on channel 4, but in fact the TNT network appeared on channel 5, methods and apparatus disclosed herein correctly apply credit for viewing on channel 5 derived from clickstream data to the TNT network (and media presented thereon).

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as a station and/or network identifier and/or media identifying information (e.g., a code mapped to the media) into an audio and/or video component of media. In some examples, the audio and/or video component is selected to have a signal characteristic sufficient to hide the watermark from human detection (e.g., masked from hearing). This is sometimes referred to as stenographic encoding. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to a station and/or network and/or to media identifying information.

Another type of media identifier used in example methods and apparatus disclosed herein is signatures or fingerprints. Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). Good signatures are repeatable when processing the same media presentation, but are unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media sources. Various comparison criteria, such as a crosscorrelation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Examples disclosed herein solve problems related to ensuring clickstream data accuracy. Clickstream data is digital computer data (e.g., set top box data, PC data, data related to any other type of media access device). Example methods and apparatus disclosed herein enhance the efficiency of correcting (digital) clickstream data to adjust for inaccuracies in reported channel lineups by using computers to automatically correct the channel lineups and using the computers to apply the corrections to the clickstream data. Automatic correction of channel lineups performed by example methods and apparatus disclosed herein enhances the accuracy of audience measurement data that relies on the clickstream data (which, in turn, relies on correct channel lineups). Verifying and/or correcting channel lineups also reduces or eliminates manual data correction, which increases costs of performing audience measurement. Example methods and apparatus disclosed herein use (digital) media presentation data, such as watermarks stored in media and/or digital fingerprints representative of the media, to enable automatic verification and/or correction of a mapping between a network and/or station and a channel number.

By leveraging the automatic verification and/or correction of a channel lineup to correct clickstream data that relies on that channel lineup, example methods and apparatus disclosed herein can correct clickstream data from hundreds or thousands of channel lineups (e.g., for different geographic areas and/or different multi-system operators such as cable television providers and/or satellite television providers) in a cost-effective manner. Example methods and apparatus disclosed herein benefit the field of audience measurement by increasing the accuracy of clickstream data which, in turn, improves the accuracy of measurements of television channel audiences. Example methods and apparatus disclosed herein conserve computing resources and/or network resources used to monitor audiences by reducing or eliminating the need to identify and send messages to multi-channel system operators (MSO) to verify channels in large numbers of distinct channel lineups for corresponding geographic regions. For example, example methods and apparatus disclosed herein reduce or eliminate the need for a computer or a person to identify a MSO for a geographic region, communicate a channel verification request and the geographic region, receive the channel verification information, and apply the channel verification to a lineup, which further requires the MSO to perform a lookup of the channel to a station and/or network. This reduction or elimination of computing and/or network resource requirements frees up these resources for other beneficial uses.

FIG. 1 illustrates an example system 100 to verify and/or correct clickstream (or return path) data. The example system 100 of FIG. 1 may be used to verify clickstream data with less manual identification of channels compared to known methods of correcting clickstream data. In some examples, no manual identification of channels is involved.

The example system 100 of FIG. 1 includes a clickstream processing system 102, which obtains return path data or clickstream data from a media provider 104, verifies and/or corrects the clickstream data, and/or generates ratings information for the media (e.g., programs, advertisements, etc.). The example clickstream processing system 102 is associated with an audience measurement entity, such as The Nielsen Company (US), LLC, which generates audience ratings for media. The media provider 104 of FIG. 1 may be a multi-system operator such as a cable television provider. However, the media provider 104 may be any type of content provider capable of providing clickstream or return path data.

The clickstream processing system 102 of the illustrated example obtains media presentation data from a verification site 106. The verification site 106 is physically located such that the verification site 106 is capable of receiving a television lineup (e.g., set of channels and corresponding channel numbering scheme) corresponding to clickstream data provided by the media provider 104. The physical location may include, for example, a geographic location or area in which the media provider 104 uses a particular mapping of channels to networks and/or stations. The example verification site 106 may be, but is not necessarily, a reference site that is independent of any panel-based measurement that may also be occurring in or near the geographic location or area of the verification site 106.

The clickstream data is collected from set top boxes by the media provider 104 and made available for media measurement. In some examples, the media provider 104 collects clickstream data from physical set top boxes as well as devices that function as tuners or set top boxes (e.g., a computing device that includes a cable tuning card and/or software that enables the computing device (e.g., a computer, a tablet, etc.) to receive media from the media provider 104 and provide clickstream data). Clickstream data can be obtained from the media provider 104 in a raw format, or can be processed by the media provider 104 to perform some validation and/or formatting of the data prior to making the data available external to the media provider 104.

The example clickstream processing system 102 obtains lineup information 110 from the media provider 104 and/or from a lineup data provider 108 (e.g., TV Guide®). In some examples, multiple verification sites 106 may be used to generate media presentation data for the clickstream processing system 102 to verify and/or to correct clickstream data provided for multiple areas that have different channel lineups. The example clickstream processing system 102 obtains lineup information 110 for each such channel lineup (e.g., from the respective media providers 104 and/or from the lineup data provider 108). An example of lineup information is described below with reference to FIG. 5B.

The example verification site 106 of FIG. 1 is associated with a first physical area (within which a particular channel mapping or lineup information scheme is used by the media provider 104). The verification site 106 of FIG. 1 includes a media presentation data collector 112, a remote control 114, and a sensor 116. The example media presentation data collector 112 transmits commands via the remote control 114 to a set top box 118 that receives the monitored service (e.g., cable and/or satellite television, streaming media, video on demand, etc.) from the media provider 104. Example remote controls include an infrared remote control, a radio-frequency remote control, a network-based remote control, a Bluetooth remote control, and/or any other type of remote control device.

The set top box 118 of the illustrated example tunes to channels according to the commands received from the remote control 114 and presents the media playing on the tuned channel on a media presentation device 120. The media presentation device may be a television, speakers, a radio, or any other type of media presentation device. While the example of FIG. 1 includes a set top box 118 to tune to channels, the example set top box 118 may be implemented using a personal computer (e.g., a home theater personal computer (HTPC)) and a CableCARD or similar tuning device, a video game console, and/or any other device capable of receiving media from the media provider 104 and outputting the media as audio and/or video via the presentation device 120. In some examples, the set top box 118, the media presentation device 120, and/or the media presentation data collector 112 are integrated into a single device. For example, a computer may implement the presentation device 120 via a display and/or speakers to present the media, the set top box 118 via a tuner card, and the media presentation data collector 112 via a software program that captures the audio in the presented media for detecting watermarks and/or generating fingerprints (e.g., signatures).

The example sensor 116 of FIG. 1 is positioned to receive audio signals output from the media presentation device 120. In some examples, the sensor 116 is a microphone that captures ambient audio proximate to the media presentation device 120. In some other examples, the sensor 116 includes a hard-wired connection to the media presentation device 120 and/or to the set top box 118 to receive the media signals. In some examples, the sensor 116 is communicatively coupled (e.g., networked) between the set top box 118 and the media presentation device 120 to snoop media signals including audio, video, and/or encoded media signals. Alternatively, the example sensor 116 may simply receive output audio and/or video signals directly from the set top box 118. In some such examples, the example media presentation device 120 is omitted.

In the example of FIG. 1, the media presentation data collector 112 generates media presentation data (e.g., codes, signatures, etc.) from the media signals (e.g., audio and/or video signals) collected from the set top box 118 and/or the media presentation device 120. For example, the media presentation data collector 112 of the illustrated example extracts watermarks from captured audio and/or video signals and/or generates signatures (fingerprints) representative of the audio and/or video.

In some other examples, the media presentation data collector 112 collects metadata that is extracted from the media by the set top box 118, by the media presentation device 120. For example, the set top box 118 may extract metadata in the form of ID3 tags (or any other format) and output the extracted metadata to the media presentation data collector 112 via a wired or wireless communications connection. In some examples, the extracted ID3 tags contain codes corresponding to watermark codes. Example methods and apparatus to embed and/or extract metadata from a data stream that may be performed by the example set top box 118 and/or the example media presentation data collector 112 of FIG. 1 are disclosed in U.S. patent application Ser. No. 13/181,147, filed on Jul. 12, 2011, U.S. patent application Ser. No. 13/341,661, filed on Dec. 30, 2011, U.S. patent application Ser. No. 13/443,596, filed on Apr. 10, 2012, U.S. patent application Ser. No. 13/455,961, filed on Apr. 25, 2012, U.S. patent application Ser. No. 13/767,548, filed on Feb. 14, 2013, U.S. patent application Ser. No. 13/778,108, filed on Feb. 26, 2013, U.S. patent application Ser. No. 13/793,959, filed on Mar. 11, 2013, U.S. patent application Ser. No. 13/793,974, filed on Mar. 11, 2013, U.S. patent application Ser. No. 13/793,983, filed on Mar. 11, 2013, and/or U.S. patent application Ser. No. 13/793,991, filed on Mar. 11, 2013. The entireties of U.S. patent application Ser. No. 13/181,147, U.S. patent application Ser. No. 13/341,661, U.S. patent application Ser. No. 13/443,596, U.S. patent application Ser. No. 13/455,961, U.S. patent application Ser. No. 13/767,548, U.S. patent application Ser. No. 13/778,108, U.S. patent application Ser. No. 13/793,959, U.S. patent application Ser. No. 13/793,974, U.S. patent application Ser. No. 13/793,983, and U.S. patent application Ser. No. 13/793,991 are hereby incorporated by reference.

Watermarks, signatures, metadata, and the like, are collectively referred to herein as media presentation data. The media presentation data identifies the media presented on one or more channels tuned by the set top box 118, but does not necessarily identify the tuned channel itself.

In the example of FIG. 1, the media presentation data collector 112 collects media presentation data from multiple channels (e.g., one channel at a time) to facilitate the automatic identification of each of the multiple channels and/or verify a mapping between the channel and a network and/or station. The example media presentation data collector 112 generates a report including the media presentation data, timestamps associated with collection of the media presentation data, and the channel associated with the media presentation data. The media presentation data collector 112 identifies the tuned channel(s) from which the media presentation data are collected by comparing the timestamp(s) associated with the media presentation data to a log of timestamped actions performed while executing a script. The example media presentation data collector 112 of FIG. 1 receives script(s) for controlling the verification set top box 118 from the example clickstream processing system 102 via, for example, a communications network. The log records times at which each of the multiple channels is tuned by the verification set top box 118 in accordance with the script. The script may specify channel information (e.g., the channel(s) to be tuned by the verification set top box 118) explicitly (e.g., via a condition such as "if X, then tune to channel Y") and/or implicitly (e.g., based on a time at which the script is executed and programmed delays in the script). The example media presentation data collector 112 of the illustrated example reports channel information based on an order of tuning the verification set top box 118 that is specified in the script.

Both the media presentation data (e.g., codes, signatures, etc.) and the channel information (e.g., channel(s) tuned by the verification set top box 118) are timestamped. The timestamps represent time(s) and/or date(s) at which the media signals were collected and/or the time(s) and/or date(s) at which a corresponding channel was tuned. This association may be done through, for example, matching timestamps. The corresponding channel is a channel to which the set top box 118 was tuned when the media signals were collected. Each item of media presentation data (e.g., each signature and/or extracted watermark) may be associated with a timestamp and/or a channel identified in the channel information. Additionally or alternatively, groups of the media presentation data (e.g., time-adjacent codes, time-adjacent signatures, etc.) may be marked with a same timestamp and/or channel identifier.

When the media presentation data has been collected for each of the channels (e.g., by performing the actions in the script and collecting media presentation data from the media presentation device), the example media presentation data collector 112 transmits the media presentation data, the timestamps, and the channels to the clickstream processing system 102. Using the media presentation data and the channel information, the example clickstream processing system 102 of FIG. 1 verifies and/or corrects the lineup information 110 for the physical area associated with the set top box 118 by, for example, determining that the mappings of channels to channel numbers (e.g., ESPN is channel 30, CNN is channel 24, etc.) are the same as reported in the lineup information 110. Example methods and apparatus to correct lineup information are described in more detail below.

The example clickstream processing system 102 of FIG. 1 determines ratings information based on the clickstream data provided by the media provider 104 and based on the verified and/or corrected lineup information. For example, the example clickstream processing system 102 may determine the number of households tuned to each channel and/or program according to the clickstream data.

Figure 2:
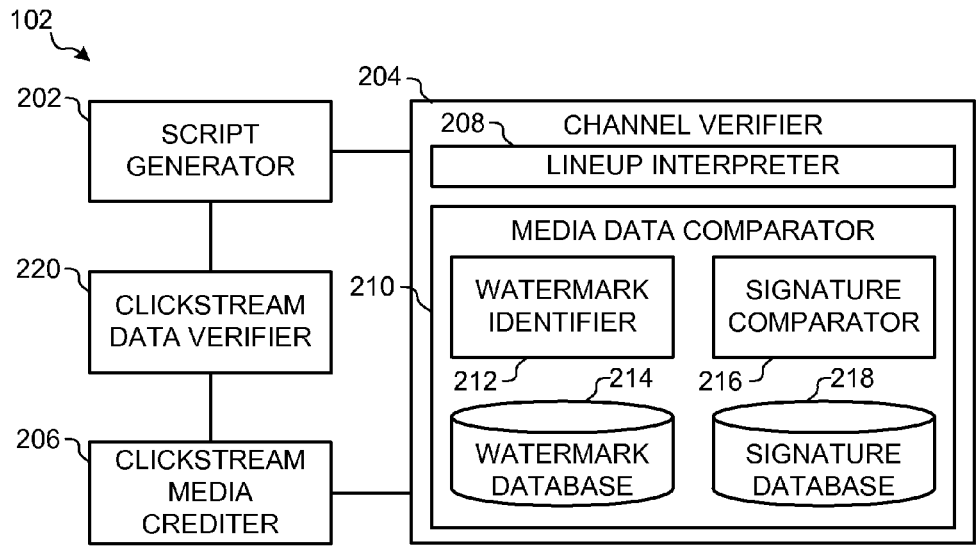
FIG. 2 is a block diagram of an example device to implement the example clickstream processing system of FIG. 1.

FIG. 2 is a block diagram of an example implementation of the example clickstream processing system 102 of FIG. 1. The example clickstream processing system 102 of FIG. 2 includes a script generator 202, a channel verifier 204, and a clickstream media crediter 206.

The example script generator 202 of FIG. 2 generates scripts to be executed by a media presentation data collector (e.g., the media presentation data collector 112 of FIG. 1). The example scripts may include instructions to cause the media presentation data collector 112 to generate and/or transmit commands to the set top box 118 (e.g., tuning commands), to collect and/or generate media presentation data and/or tuning information data, and/or to transmit the media presentation data to the clickstream processing system 102. The script may be customized for a particular verification site, a type of remote 114, a type of set top box 118, a monitored area, a particular a particular study, and/or a type of media presentation data collector 112. The example script generator 202 may transmit the generated script(s) to corresponding media presentation data collectors (e.g., the media presentation data collector 112 of FIG. 1) for collection of media presentation data.

Based on the media presentation data and/or channel information returned by the media presentation data collector 112, the example channel verifier 204 of FIG. 2 verifies lineup information 110 received from the media provider 104 and/or from the lineup data provider 108 of FIG. 1. For example, the channel verifier 204 determines, for each channel (e.g., each channel from which media presentation data was received from the media presentation data collector 112 as indicated by the channel information, and/or each channel included in the lineup information 110), whether the media presentation data collected while tuned to the channel matches reference data. In some examples, the reference data is representative of the network/station assigned to a channel according to the lineup information 110. Additionally or alternatively, the reference data is representative of media presented on the channel and/or the network and/or station according to the lineup information and/or program schedule information. based on the timestamp and the channel associated with the media presentation data. The reference data may be selected based on the type of media presentation data collected by the media presentation data collector 112.

To verify and/or correct lineup information, the example channel verifier 204 of FIG. 2 includes a lineup interpreter 208 and a media data comparator 210. The media data comparator 210 includes a watermark identifier 212, a watermark database 214, a signature comparator 216, and a signature database 218. In some examples, the media data comparator 210 exclusively uses watermarks and omits the signature comparator 216 and the signature database 218. In other examples, the media data comparator 210 exclusively uses signatures and omits the watermark identifier 212 and the watermark database 214.

The example lineup interpreter 208 of FIG. 2 receives or accesses the lineup information 110 from the media provider 104 and/or the lineup data provider 108. The lineup information 110 in the example of FIG. 2 includes a set of networks and/or stations, and the channels to which the set of networks and/or stations are mapped. In some examples, the lineup interpreter 208 determines program schedule information based on the lineup information and/or a designated time. Example program information includes a set of media identifiers (e.g., identifiers of programs) for media presented on designated channels at designated times (e.g., designated time slots, such as ½ hour time slots) and/or during designated time ranges (e.g., time ranges defined using start times and end times). The media identifiers may include titles of media, episode names of media, episode numbers of media, unique media identification numbers, and/or any other type of media identifier.

In some examples, the lineup interpreter 208 of FIG. 2 translates the channel, the network and/or station, the media identifier, and/or the time to a lookup key. The media data comparator 210 of the illustrated example uses the resulting lookup key to identify the correct reference data. The example media data comparator 210 uses the reference data to verify and/or correct the channels in the lineup information 110.

The example media data comparator 210 accesses the script generated by the script generator 202, obtains the network, station, and/or channel from the lineup interpreter 208, and obtains media presentation data from the media presentation data collector 112 collected based on the generated script. For each channel programmed via the script, the example media data comparator 210 compares the media presentation data (e.g., watermarks, signatures) collected while the channel is tuned by the set top box 118 to reference data (identified using the media identifier obtained from the lineup interpreter 208).

In examples in which the watermark identifier 212 identifies a watermark (or code) as a known code (e.g., in the watermark database 214), the example channel verifier 204 verifies channel information and/or clickstream data using the identified code and the lineup information identified by the lineup interpreter 208. For example, the media data comparator 210 determines whether the code identified by the watermark identifier 212 matches a reference code that corresponds to the network and/or station assigned to the channel on which the identified code was observed. For example, the media data comparator 210 determines (from the lineup information 110) that channel 1 corresponds to station WABC. The example channel verifier 204 further determines (from the watermark database 214) that WABC corresponds to a code "01100110." The example media data comparator 210 may then compare an identified code observed when the verification set top box 118 was tuned to channel 1 to the reference code "01100110" to determine whether the codes match. If the identified code does not match the reference code, the example channel verifier 204 takes corrective steps to determine the correct network and/or station assigned to the channel on which the code was identified, as discussed in more detail below.

To determine whether watermark data matches reference watermark data, the example watermark identifier 212 of FIG. 2 identifies a network and/or station corresponding to the watermark. For example, the watermark may include a string of bits or other symbols (e.g., a fifteen-bit binary number or code) that may be decoded into readable data (e.g., a program title, an episode number, a media identifier, a station identifier and timestamp, etc.) and/or that may be used as an index to look up a network and/or station in the watermark database 214. When the watermark is used as an index, the example watermark identifier 212 obtains (e.g., looks up) the network and/or station (e.g., the ABC network, a local network affiliate station WABC, etc.) based on the watermark data (e.g., decoded watermark data). The example watermark identifier 212 compares the resulting network and/or station identifier to a reference network and/or station identifier determined from the channel, network, and/or station obtained from the lineup interpreter 208.

In other examples, the watermark identifier 212 retrieves a reference watermark from the watermark database 214 (e.g., using the media identifier received from the lineup interpreter 208 as an index) and compares the retrieved reference watermark to the watermark data received from the media presentation data collector 112. For example, the watermark identifier 212 may determine that the media identifier P09876 received from the lineup interpreter 208 corresponds to a reference watermark in the watermark database 214. The example watermark identifier 212 compares the reference watermark to the watermark received from the media presentation data collector 112 to determine whether the watermarks match (e.g., whether the watermarks are identical).

In examples in which the signature comparator 216 compares signatures from presented media to identify matching signatures (e.g., in the signature database 218), the example lineup interpreter 208 of FIG. 2 translates the network and/or station, the channel, and/or the time to a signature lookup key. For example, the lineup interpreter 208 determines a media item that is programmed for the channel and the time at which signatures were collected by the media presentation data collector 112, based on a program schedule.

The example signature database 218 of FIG. 2 includes mappings of signatures obtained from reference media to identifiers of the reference media from which the signatures were generated. The example lineup interpreter 208 uses the media item (e.g., an identifier corresponding to a show and/or episode) to look up a set of reference signatures generated from that media item in the signature database 218. For example, the example media data comparator 210 of FIG. 2 may translate a first program title (e.g., "Chicago Fire"), network (e.g., "NBC affiliate"), and time (e.g., 03:00 UTC 2013 Nov. 21) to a unique media identifier (e.g., P54321), for which a set of reference signatures can be obtained from the signature database 218 for comparison.

The signature comparator 216 compares the signatures collected by the media presentation data collector 112 to the reference signatures obtained from the signature database 218 to verify and/or correct the channels in the lineup information 110. The signature comparator 216 may identify a match based on, for example, whether a threshold number and/or percentage of the received signatures match the reference signatures. For example, the signature comparator 216 of the illustrated example receives a media identifier P34567 from the lineup interpreter 208 and accesses the signature database 218 based on the media identifier P34567 to extract a set of associated reference signatures. The example signature comparator 216 compares signatures collected by the media presentation data collector 112 (e.g., while the set top box 118 is tuned to a channel scheduled to present the media associated with the media identifier P34567) to the set of reference signatures. The signature comparator 216 determines a match based on whether at least a threshold number of the collected signatures (e.g., signatures representing at least threshold period of time) match reference signatures. If the collected signatures do not match the reference signatures, the example channel verifier 204 may initiate corrective steps to determine the correct network and/or station assigned to the channel from which the signatures were collected by the media presentation data collector 112, as discussed in more detail below.

In some examples, because the media presentation data collector 112 may only collect signatures representing a relatively short period of time (e.g., a few minutes) for any given channel, the signature comparator 216 may only match a portion of the reference signatures representing reference media to the signatures received from the media presentation data collector 112.

In some other examples, metadata (e.g., ID3 tags) extracted from the media is used as a lookup key to identify a station, a network, and/or media presented on the channel. For example, the channel verifier 204 of FIG. 2 may search a database using the metadata as a lookup key, where the lookup key is stored in association with the network, the station, and/or the media. Examples of identifying a network, a station, and/or media are described in U.S. patent application Ser. No. 13/181,147, U.S. patent application Ser. No. 13/341,661, U.S. patent application Ser. No. 13/443,596, U.S. patent application Ser. No. 13/455,961, U.S. patent application Ser. No. 13/767,548, U.S. patent application Ser. No. 13/778,108, U.S. patent application Ser. No. 13/793,959, U.S. patent application Ser. No. 13/793,974, U.S. patent application Ser. No. 13/793,983, and U.S. patent application Ser. No. 13/793,991.

When the network and/or station corresponding to an extracted code matches the network and/or station assigned to the channel in the lineup information, and/or when a threshold number of signatures (and/or a corresponding media identifier) match reference signatures (and/or a corresponding reference media identifier), the example channel verifier 204 confirms that the channel mapping is correct (e.g., annotates the lineup information 110) and/or confirms that the lineup information 110 is correct for the channel.

On the other hand, when the media presentation data does not match the reference data, the example channel verifier 204 corrects the lineup information 110 for A) the channel to which the verification set top box 118 was tuned when the non-matching media presentation data was collected and/or B) the network and/or station assigned to the channel according to the lineup information 110. For example, if the media presentation data collected at a first time when the verification set top box 118 is tuned to channel 2 does not match the reference data associated with the network and/or station assigned to channel 2 according to the lineup information 110, the example channel verifier 204 determines a network, station, and/or media that is actually mapped to channel 2. Additionally or alternatively, the example channel verifier 204 determines a channel to which the network and/or station that is incorrectly mapped to channel 2 is actually assigned.

To determine a network and/or station that is actually mapped to the non-matching channel number, the example channel verifier 204 of the illustrated example compares A) the media presentation data (e.g., signatures) collected when the set top box 118 was tuned to the channel, to B) reference data (e.g., reference signatures) for media presented on other channels (e.g., according to the program schedule) during the time period in which the media presentation data was collected. For example, the lineup interpreter 208 of FIG. 2 determines a time period during which the media presentation data was collected (e.g., 12:02 P.M. to 12:04 P.M. on Nov. 18, 2013). The example lineup interpreter 208 of the illustrated example also determines media identifiers for media presented on other channels during the corresponding time period (e.g., the 12:02 P.M. to 12:04 P.M. time period on Nov. 18, 2013 and/or, more generally, the 12:00 P.M. to 12:30 P.M. time slot on Nov. 18, 2013). The example media data comparator 210 (e.g., via the signature comparator 216) compares the media presentation data to the reference data associated with the media presented on the other channels until a match is found.

If a match is found between the media presentation data and reference data associated with another channel, the example channel verifier 204 corrects the lineup information 110 such that the channel is associated with the correct network and/or station. On the other hand, if no match is found, the example channel verifier 204 of the illustrated example attempts to verify the channel using alternate media presentation data (e.g., media presentation data collected at another time) or annotate the channel for manual verification.

Additionally or alternatively, the example media data comparator 210 may determine the network and/or station mapped to the non-matching channel by comparing a code extracted while tuned to the channel to other codes in the watermark database 214. By comparing the extracted code to the codes in the watermark database 214, the example media data comparator 210 identifies the network and/or station matching the code. Because the code was observed on the non-matching channel, the network and/or station matching the observed code can be mapped to the non-matching channel in the lineup information 110.

For example, if network affiliate WCBS is mapped to channel 2 in the lineup information 110 and the watermark identifier 212 determines that the code extracted by the media presentation data collector 112 when the verification set top box 118 was tuned to channel 2 does not correspond to WCBS, the example watermark identifier 212 determines which of the codes in the watermark database 214 matches the extracted code. In this example, the watermark identifier 212 determines that the extracted code matches WABC and the channel verifier 204 modifies the lineup information 110 to map WABC to channel 2.

In some examples, the media data comparator 210 determines a network and/or station mapped to the non-matching channel by looking up metadata (e.g., ID3 tags) extracted while tuned to the channel in a metadata database (e.g., generating a database query using the metadata as a key). The example metadata may identify the channel, the network and/or station, and/or the media being presented. If the query results in a match, the example media data comparator 210 may determine that the network, station, and/or media are associated with the channel tuned by the set top box at the time the metadata was extracted. Examples of identifying a channel, network, station, and/or media based on metadata extracted from the media are described in U.S. patent application Ser. No. 13/181,147, U.S. patent application Ser. No. 13/341,661, U.S. patent application Ser. No. 13/443,596, U.S. patent application Ser. No. 13/455,961, U.S. patent application Ser. No. 13/767,548, U.S. patent application Ser. No. 13/778,108, U.S. patent application Ser. No. 13/793,959, U.S. patent application Ser. No. 13/793,974, U.S. patent application Ser. No. 13/793,983, and U.S. patent application Ser. No. 13/793,991.

To determine the channel on which the non-matching reference data (e.g., signatures associated with media scheduled for presentation on the channel) was presented using signatures, the example signature comparator 216 compares the non-matching signatures (and/or signatures corresponding to the same channel as the non-matching signatures but corresponding to media presented at times that are earlier and/or later than the non-matching signatures) to alternate signatures collected by the media presentation data collector 112 on other channels. Because the media presentation data collector 112 of FIG. 1 collects media presentation data (e.g., signatures) for different channels at different times (e.g., collects signatures for channel 2 from 12:02 PM to 12:04 PM, collects signatures for channel 3 from 12:04 P.M. to 12:06 P.M., etc.), the example channel verifier 204 may need to expand the potential reference signatures to be compared to the non-matching signatures to determine a match. For example, if Program A did not match to channel 2, the channel verifier 204 of the illustrated example may check signatures obtained from channels 3, 4, 5, and so on, to determine whether Program A (or programs scheduled before and/or after Program A) matches media collected from one of the channels 3, 4, 5, and so on.

The expanded potential reference signatures may include, for example, reference signatures associated with media presented on the same channel as the non-matching reference signatures during the time period during which the media presentation data collector 112 was collecting signatures for the channels associated with the script. For example, if the script causes the media presentation data collector 112 to collect media presentation data from 12:00 P.M. to 2:45 P.M. on a designated day, the lineup interpreter 208 determines media identifiers for the channel corresponding to the non-matching reference signatures for the times between 12:00 P.M. and 2:45 P.M. on the designated day.

The example signature comparator 216 compares the signatures for each channel to reference data associated with the media identifier (e.g., received from the lineup interpreter 208) to identify a channel that presented the non-matching reference data (or, alternatively, identify the channel assigned to the network and/or station associated with the non-matching reference data). In the example of FIG. 2, the signature comparator 216 determines a portion of the reference signatures that were presented at a time at which the signatures for a particular channel was collected. The signature comparator 216 may use an approximate window determined based on the scheduled time of the reference media and based on the position of the signatures within the media. In some examples, the media data comparator 210 determines the portion of the reference signatures for the media presentation data collected from each channel.

To increase the efficiency of identifying the channel on which the media corresponding to the non-matching reference signatures was presented, the example signature comparator 216 compares the portions of the reference signatures to the signatures collected at the same time prior to comparing other reference signatures to the collected signatures. In some examples, the signature comparator 216 omits comparing the collected signatures for those channels, networks, and/or stations that have already been confirmed or corrected.

Additionally or alternatively, the example watermark identifier 212 of FIG. 2 determines the channel on which the non-matching reference data (e.g., watermarks extracted by the media presentation data collector 112) was presented to correct the lineup information 110. For example, the watermark identifier 212 may determine the channel by comparing the non-matching reference code to codes extracted by the media presentation data collector 112 when the verification set top box 118 was tuned to channels other than the channel to which the non-matching reference code was incorrectly mapped (according to the lineup information 110). By identifying a code collected by the media presentation data collector 112 as matching the non-matching reference code, the example watermark identifier 212 determines the channel to which the network and/or station corresponding to the non-matching reference code is assigned. The media data comparator 210 may use any other type of metadata to determine the e channel on which the non-matching reference data (e.g., metadata extracted by the media presentation data collector 112) was presented.

For example, if the code "01010101" maps to network affiliate KNBC, which is incorrectly mapped to channel 6 in the lineup information 110, the example watermark identifier 212 searches the media presentation data obtained from the media presentation data collector 112 to determine which of the channels was tuned when the code "01010101" was extracted. In this example, the channel 7 was tuned by the verification set top box 118 when the media presentation data collector 112 extracted the code "01010101." Accordingly, the example channel verifier 204 automatically corrects the lineup information 110 to reflect the mapping of KNBC to channel 7.

When the channel verifier 204 has verified the correctness of the lineup information 110 and/or corrected channel mappings in the lineup information 110, the example clickstream media crediter 206 of FIG. 2 corrects clickstream data generated by the media provider 104. For example, the clickstream media crediter 206 may process the clickstream data to determine a number of set top boxes tuned to each channel number and/or presented media item (e.g., program, advertisement). The clickstream data includes channel tuning data for set top boxes. The clickstream media crediter 206 of the illustrated example determines the channels tuned by each of the set top boxes represented in the clickstream data. For example, for a given set top box, the example clickstream media crediter 206 interprets the clickstream data to identify tuning commands, power commands, and/or other clickstream data and associated timestamps. The clickstream data and timestamps indicate the channel(s) to which the set top box was tuned. By applying the clickstream data to the channel mappings in the lineup information, the clickstream media crediter 206 determines the audiences for the programs. In this example, the clickstream media crediter 206 then applies the verified and/or corrected lineup information to credit each channel and/or media item (e.g., program) with the audience determined from the clickstream data.

The example clickstream processing system 200 of FIG. 2 further includes a clickstream data verifier 220. Subsequent to execution of the script generated by the script generator 202, the example clickstream data verifier 220 receives clickstream data associated with the verification site 106 of FIG. 1 (e.g., clickstream data for the set top box 118). The clickstream data verifier 220 compares the clickstream data (e.g., commands identified in the clickstream data) to the commands included in the script to determine the clickstream data that corresponds to each command executed by the set top box 118. In some other examples, the clickstream data verifier 220 verifies that the clickstream data matches known commands and/or identifies discrepancies between clickstream data expected based on the script and the actual clickstream data provided from the media provider 104 for the verification site 106.

The example clickstream media crediter 206 of FIG. 2 may use the verified and/or corrected clickstream data mapping to interpret the clickstream data for audience measurement. For example, the clickstream media crediter 206 of the illustrated example may determine, based on the clickstream data, an audience (e.g., a number of set top boxes tuned) for each channel and/or media presentation, determine trick play and/or time-shifted media presentations, and/or identify muted media presentations, among other things. Determining an audience for media may include, for example, summing a number of set top boxes for which the associated clickstream data indicates that the tuned channel and associated timestamp corresponding to the media. Certain commands may cause set top box tuning in some contexts but not in other contexts.

Figure 3:
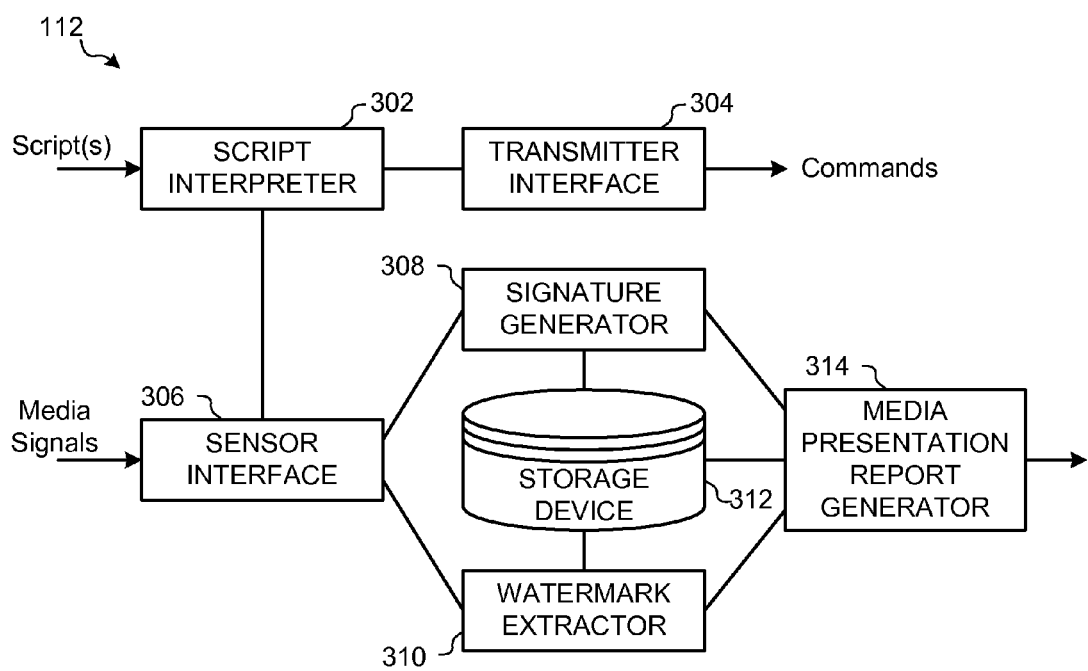
FIG. 3 is a block diagram of an example device to implement the example media presentation data collector of FIG. 1.

FIG. 3 is a block diagram of an example implementation of the example media presentation data collector 112 of FIG. 1. The example media presentation data collector 112 of FIG. 3 receives script(s) from the example clickstream processing system 102 of FIGS. 1 and/or 2. Based on the script(s), the example media presentation data collector 112 of FIG. 3 collects media presentation data and channel information, and provides the collected media presentation data and channel information, times at which the media presentation data and channel information is collected, and channels to which the set top box 118 was tuned to the clickstream processing system 102.

The example media presentation data collector 112 of FIG. 3 includes a script interpreter 302, a transmitter interface 304, a sensor interface 306, a signature generator 308, a watermark extractor 310, a storage device 312, and a media presentation report generator 314.

The example script interpreter 302 of FIG. 3 receives a script from the example clickstream processing system 102. The script interpreter 302 executes the script instructions to directly control the transmitter interface 304 (e.g., to generate output transmissions) and/or the sensor interface 306 (e.g., to collect, process, and/or store input signals). In some examples, the script interpreter 302 is provided with a script during setup and/or configuration of the media presentation data collector 112 at the verification site 106. The script is periodically and/or aperiodically updated to, for example, include newly added and/or reconfigured channels available from the media provider 104 at the set top box 118. The script may be executed periodically (e.g., based on a clock), aperiodically (e.g., in response to one or more events), in response to a request from the clickstream processing system 102, and/or at any other time.

The example transmitter interface 304 of FIG. 3 provides an interface between the script interpreter 302 and the example remote control 114 of FIG. 1. For example, the transmitter interface 304 may include a translator to translate commands from a format used in the script to a format used by the remote control 114 (e.g., universal serial bus (USB) messages). In some other examples, the transmitter interface 304 converts the commands directly to electromagnetic signals (e.g., radio frequency signals, infrared frequency signals, Bluetooth signals, etc.) to be transmitted directly by the example remote control 114 that may not have a signal converter. The transmitter interface 304 outputs the commands to cause the set top box 118 to tune to selected channels and to thereby cause the media presentation device 120 to output media signals (e.g., audio and/or video signals).

The example sensor interface 306 of FIG. 3 receives media signals and/or data from the example sensor 116 of FIG. 1. In some examples, the sensor interface 306 is selectively instructed by the script interpreter 302 to collect and/or store the media signals and/or data. For example, the sensor interface 306 may be controlled to collect and/or store signals and data during time periods following the transmitter interface 304 issuing commands to the remote control 114. At other times, the example sensor interface 306 may be selectively instructed to ignore or discard input, such as when no media of interest is being presented via the media presentation device 120. The example media signals and/or data may include audio signals (e.g., analog audio recorded via a microphone sensor), video signals (e.g., analog video recorded via an image sensor or received from a video line out connection), and/or digital data versions (e.g., digital samples) of audio and/or video (e.g., digitized audio, digitized video).

The example sensor interface 306 provides the media signals and/or data to the signature generator 308 and/or to the watermark extractor 310. The example signature generator 308 of FIG. 3 generates signatures or fingerprints of the media signals and/or data. For example, the signature generator 308 may generate signatures of overlapping blocks of audio received via the sensor interface 306 to characterize the audio presented on a tuned channel during a time period. Example methods and apparatus to implement the example signature generator 308 are described in U.S. Pat. No. 8,600,531. However, any other method of signaturing or fingerprinting may additionally or alternatively be used. The entirety of U.S. Pat. No. 8,600,531 is hereby incorporated by reference.

The example signature generator 308 of FIG. 3 stores the generated signatures in the example storage device 312 and/or provides the signatures to the media presentation report generator 314. The example signature generator 308 associates (e.g., tags/timestamps) each generated signature with a timestamp indicative of the time and date at which the fingerprinted media was received by the sensor interface 306. The signature generator 308 also associates each generated signature with an indication of the channel on which the fingerprinted media was received by the sensor interface 306 (e.g., the channel tuned by the STB 118, which may be determined by the script interpreter 302 based on the commands in the script and/or a time at which the script is executed).

In addition or as an alternative to the signature generator 308, the example watermark extractor 310 of FIG. 3 determines whether any watermarks or embedded codes are present in the media signals and/or data. For example, audience measurement systems routinely insert codes into audio portions of television media. Such codes are mostly or completely inaudible (e.g., audio masked) to human listeners but can be detected by specialized detectors that receive the audio. Example methods and apparatus to implement the example watermark extractor 310 are described in U.S. Pat. No. 8,369,972. However, any other method of watermark extraction or decoding may additionally or alternatively be used. The entirety of U.S. Pat. No. 8,369,972 is hereby incorporated by reference.

If the watermark extractor 310 identifies a watermark in the media signals and/or data, the watermark extractor 310 stores the watermark in the storage device 312 and/or provides the watermark(s) to the media presentation report generator 314. The example watermark extractor 310 associates (e.g., tags/timestamps) each watermark with a timestamp indicative of the time and date at which the watermarked media was received by the sensor interface 306. The watermark extractor 310 also associates each watermark with an indication of the channel presenting the watermarked media (e.g., the channel tuned by the STB 118, which may be determined by the script interpreter 302 based on the commands in the script and/or a time at which the script is executed).

The example media presentation report generator 314 of FIG. 3 generates and transmits a report to the example clickstream processing system 102 of FIG. 1. In the example of FIGS. 1 and 3, the report includes the generated signatures and/or the extracted watermarks resulting from executing the script via the media presentation data collector 112 at the verification site 106. The example report further includes timestamps and channels associated with the signatures and/or watermarks.

FIG. 4 is pseudocode representative of an example script 400 to collect media presentation data and channel information for verifying and/or correcting clickstream data. The script 400 represents executable instructions that may be interpreted and/or executed by, for example, the script interpreter 302 of FIG. 3.

The example script 400 of FIG. 4 performs the following general functions to collect media presentation data and channel information: 1) cause the transmitter interface 304 and/or the remote control 114 of FIGS. 1 and/or 3 to transmit a command to tune the set top box 118 to a designated channel using one or more discrete commands; 2) collect media signals and/or data; 3) process the collected media signals and/or data to generate signatures and/or extract watermarks; and 4) generate and transmit a report including the media presentation data and channel information when the media presentation data and channel information have been collected for each of the channels included in the script 400.

The example script 400 includes a sub-routine 402 to collect and store media presentation data and channel information. For example, the sub-routine 402 includes instructions to collect media signals and/or data (line 406), determine a current time (e.g., to generate a timestamp) (line 408), extract a watermark (line 410), generate a signature (line 412), and store signatures and/or watermarks in the storage device 312 of FIG. 3 (e.g., in an array) (lines 414-416). In the example of FIG. 4, lines 414-416 store the signatures and/or watermarks in association with the timestamp and the tuned channel (e.g., a variable representative of a channel). The example "for" loop in line 404 of the sub-routine 402 sets a number of loops that may determine a duration of time for which media signals are captured for a particular channel. In some examples, the duration is received as an input to the sub-routine 402. In some other examples, the duration is a fixed duration set during generation of the script 400.

Line 406 causes the example sensor interface 306 to read media signals and/or data from the sensor 116 of FIG. 1 (e.g., to "pop" one or more samples from the sensor 116 from a stack or memory). The example line 406 may call another sub-routine associated with a software or firmware driver for the sensor 116 to obtain the data. At line 408, the example script interpreter 302 stores the current time, which substantially represents the time at which the media signals were captured via the sensor 116.

Line 410 of FIG. 4 causes the example watermark extractor 310 of FIG. 3 to attempt to extract a watermark from the media signals (obtained in line 406). The example line 410 of FIG. 4 calls one or more watermark extraction sub-routines such as watermark extraction algorithm(s). In some examples, the watermark extraction algorithm(s) are selected based on watermarks known (or expected) to be present in the media signals. Line 412 of FIG. 4 causes the example signature generator 308 of FIG. 3 to generate one or more signatures of the media signals (obtained in line 406). Line 412 may call another sub-routine such as one or more signature generation algorithms.

Line 414 stores the generated signature(s) in a data structure such as an array. In the example script 400 of FIG. 4, line 414 stores the signature(s) in association with the time at which the media signals (from which the signature(s) are generated) were collected and in association with the channel to which the set top box 118 was tuned. Similarly, line 416 of FIG. 4 stores any extracted watermark(s) in another data structure such as an array. Line 416 stores the extracted watermarks in association with the time at which the media signals (from which the watermarks are extracted) were collected and in association with the channel to which the set top box 118 was tuned. The example subroutine 402 iterates to store additional media presentation data and channel information and/or returns to the main body of the script 400, discussed below.

Execution of the example script 400 of FIG. 4 begins at the line designated 418, at which the example transmitter interface 304 and/or the remote control 114 transmit a "1" to the example set top box 118. The set top box 118 is expected to tune to channel 1 in response. In some examples, the tuning by the set top box 118 is unverified. In some other examples, the clickstream data for the set top box 118 is collected by the set top box 118. In such examples, the clickstream data may be obtained from a meter in the set top box 118 and/or requested and received from the media provider 104 to confirm (e.g., via the clickstream data verifier 220) that the set top box 118 actually tuned to the channel 1 as intended. In lines 420 and 422, the script interpreter 302 sets an array storage location and a channel variable for use by the sub-routine 402. The example script interpreter 302 then calls the example sub-routine 402 at line 424 to collect the media presentation data for the tuned channel (e.g., channel 1).

When the sub-routine 402 called at line 424 ends, the script 400 continues to lines 426-434 to repeat the tuning of the set top box 118 and the collection of media presentation data for channel 10. In the example lines 426, 428, commanding the set top box 118 to channel 10 includes transmitting multiple discrete commands in close succession (e.g., to mimic pushing the "1" button and then, shortly thereafter, pressing the "0" button on a remote control). However, the transmitter interface 304 and/or the remote control 114 may transmit any number of discrete and/or composite commands to cause the set top box 118 to tune to the designated channel. Such commands may include navigating a guide and/or incrementing and/or decrementing a channel number (e.g., mimicking "channel up" and/or "channel down" button presses).

When the sub-routine called at lined 434 ends, an example while loop causes the script interpreter 302 to wait until a designated time (e.g., 12:05:00 P.M. in the example of FIG. 4). The waiting period may be used to, for example, avoid having advertisements or other media potentially interfering with subsequent matching of signatures and/or watermarks (e.g., by the clickstream processing system 102 of FIG. 1). When the time has been reached, at line 438 the transmitter interface 304 and/or the remote control 114 transmit a ChannelUp signal to cause the set top box 118 to tune to channel 11 (e.g., after channel 10 from lines 426, 428). Line 440 similarly increments the channel variable. Line 442 sets the array storage location and line 444 calls the sub-routine 402 to collect the media presentation data for channel 11.

The example tuning, variable assignment, and/or media presentation data collection repeat for additional channels of interest. When media presentation data has been collected for all channels of interest, the example media presentation report generator 314 generates a new report document or file at line 446. At line 448, the media presentation report generator 314 adds the signature data (e.g., in the signature array) and the watermark data (e.g., in the watermark array) to the report file. The example media presentation report generator 314 then transmits the report file to the example clickstream processing system 102 at, for example, an IP address or domain name of the clickstream processing system 102. After transmitting at line 450, the example script 400 of FIG. 4 ends.

In the example of FIG. 4, the script 400 further includes instructions 452-458 to transmit non-tuning commands. Examples of such commands include a volume up command, a volume down command, a mute command, an electronic guide command, a navigation command (e.g., up, down, left, right commands indicated by directional buttons on a remote control), a confirmation or selection command (e.g., an "enter" button on a remote control), trick play commands (e.g., pause, play, fast forward, rewind, stop, etc.), and/or any other commands that may be available to a set top box subscribed to the media provider 104 (and/or any other providers).

The example non-tuning commands included in the example script 400 may be used by the clickstream processing system 102 for subsequent verification of clickstream data (e.g., to verify clickstream data including such commands). In some examples, the non-tuning commands are used by the clickstream processing system 102 to infer tuning, such as a sequence of clickstream data representative of an electronic guide command, a set of navigation (e.g., directional commands to navigate the guide) and/or tuning commands (e.g., numeric commands to navigate the guide), a selection command, and/or an exit command.

While the script 400 explicitly includes channels for clarity of description, the example script 400 may cause the script interpreter 302 to refer to a channel information source to determine a next channel to be tuned. For example, the script interpreter 302 may refer to an electronic program guide or other resource to determine channels to be tuned.

While the example clickstream processing system 102 and the example media presentation data collector 112 of FIGS. 1, 2, and/or 3 are disclosed above with reference to both signatures and watermarks, either signatures or watermarks may be used exclusively (e.g., use only signatures). Alternatively, signatures and/or watermarks may be used preferentially (e.g., when watermarks can be extracted from the media signals, do not generate signatures), or in combination (e.g., generate signatures and extract watermarks for all or a portion of the data).

Figure 5A:
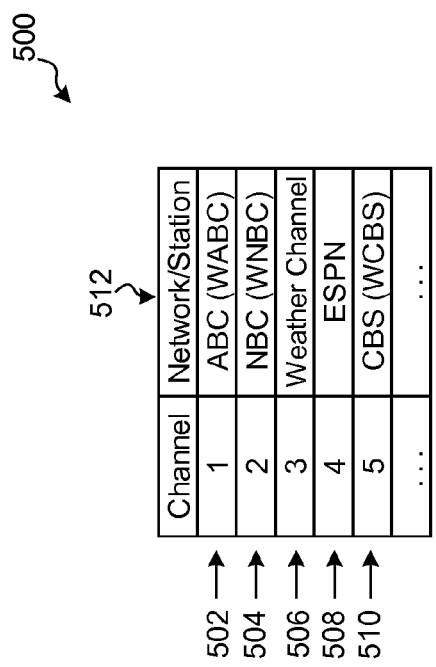
FIG. 5A is a table representative of example lineup information provided by the example media provider of FIG. 1.

FIG. 5A is a table representative of example lineup information 500 provided by the example media provider 104 of FIG. 1. The example lineup information 500 of FIG. 5 is organized by channel numbers 502-510. Each of the example channel numbers has a corresponding network/station 512 assigned by a multi-channel video programming distributor (e.g., cable television, direct-broadcast satellite, etc.) for the corresponding geographic area. For example, according to the lineup information 500, the example channel 1 502 for the media provider 104 presents the local affiliate WABC of national network ABC in the applicable geographic area.

Figure 5B:
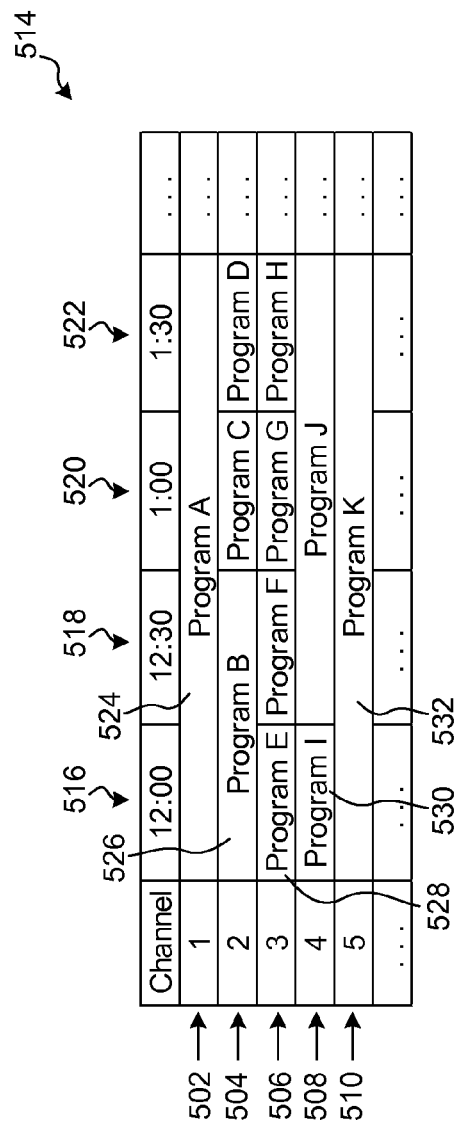
FIG. 5B is a table representative of example program schedule information provided by the example media provider of FIG. 1.

FIG. 5B is a table representative of example program schedule information 514 provided by the example media provider 104 of FIG. 1. The example program schedule information 514 includes the channels 502-510 of FIG. 5A and further specifies time slots 516-522. Using the program schedule information 514, the example lineup interpreter 208 of FIG. 2 determines which media (e.g., Program A 524, Program B 526, etc.) is being presented during a particular time slot or period on a particular channel number.

When determining what reference data is to be compared to media presentation data to verify or correct a channel mapping, the lineup interpreter 208 of the illustrated example determines the channel 502-510 from which the media presentation data was obtained (e.g., which channel the verification set top box 118 was tuned to at the time of collection) and a time at which the media presentation data was collected. The example lineup interpreter 208 looks up the time slot corresponding to the time and channel associated with the media presentation data. The lineup interpreter 208 of FIG. 2 provides an identifier of the media (e.g., an identifier of Program A 524, an identifier of Program B 526, etc.) to the media data comparator 210.

Figure 6:
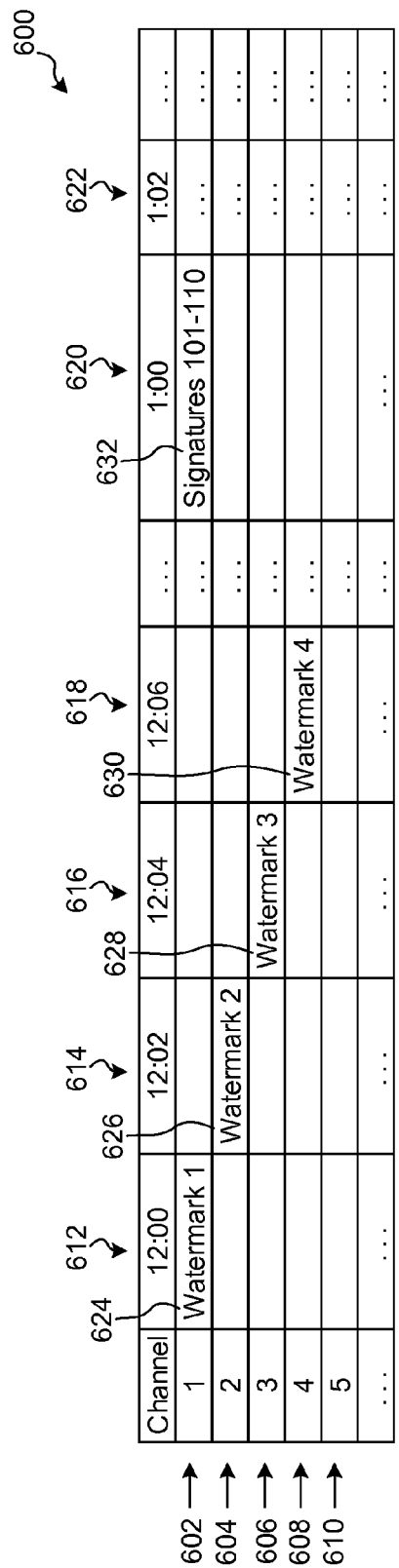
FIG. 6 is a table representative of a media presentation log including media presentation data collected via the example media presentation data collector of FIGS. 1 and/or 3.

FIG. 6 is a table representative of a media presentation log 600 including media presentation data collected via the example media presentation data collector 112 of FIGS. 1 and/or 3. The example media presentation log 600 illustrated in FIG. 6 may represent the example signature array and/or the example watermark array described with reference to the script 400 of FIG. 4.

The example media presentation log 600 is arranged by channel (e.g., channel number) 602-610 and by time slots 612-622. Unlike the time slots 516-522 of FIG. 5B that are divided into scheduled times, the example time slots 612-622 are divided into times during which the media presentation data (e.g., watermark data and/or signature data) are collected. The example time slots 612-622 may therefore be determined from the timestamps associated with the media presentation data.

In the example of FIG. 6, a first watermark 624 was collected (e.g., via the media presentation data collector 112) between 12:00 P.M. and 12:02 P.M. when the set top box 118 of FIG. 1 was tuned to channel 1. A second watermark 626 was collected between 12:02 P.M. and 12:04 P.M. while the set top box 118 was tuned to channel 2. Signatures 632 numbered 101-110 were generated based on media signals and/or data collected between 1:00 P.M. and 1:02 P.M. on channel 1. The limits (e.g., start times and end times) of the example time slots 612-622 are determined based on the timestamps associated with the media presentation data. Thus, one or more time slots 612-622 may be omitted if no media presentation data is collected during those time slots.

While each of the example time slots 612-622 illustrated in FIG. 6 includes a watermark or signatures, the example time slots may be populated with any combination of one or more watermarks, one or more signatures, and/or any other type of media presentation information. In the example of FIG. 6, only one channel 602-610 is populated with media presentation data 624-632 for any given time slot 612-622. However, in examples in which multiple verification sites are used, multiple channels 602-610 may include media presentation data for a particular time slot 612-622 and/or two or more time slots 612-622 may overlap.

While an example manner of implementing the clickstream processing system 102 of FIG. 1 is illustrated in FIG. 2 and an example manner of implementing the media presentation data collector 112 of FIG. 1 is illustrated in FIG. 3, one or more of the elements, processes and/or devices illustrated in FIGS. 1, 2, and/or 3 may be combined, divided, re-arranged, omitted, eliminated and/or implemented in any other way. Further, the example remote control 114, the example sensor 116, the example script generator 202, the example channel verifier 204, the example clickstream media crediter 206, the example lineup interpreter 208, the example media data comparator 210, the example watermark identifier 212, the example watermark database 214, the example signature comparator 216, the example signature database 218, the clickstream data verifier 220, the example script interpreter 302, the example transmitter interface 304, the example sensor interface 306, the example signature generator 308, the example watermark extractor 310, the example storage device 312, the example media presentation report generator 314 and/or, more generally, the example clickstream processing system 102 and/or the example media presentation data collector 112 of FIGS. 1, 2, and/or 3 may be implemented by hardware, software, firmware and/or any combination of hardware, software and/or firmware. Thus, for example, any of the example remote control 114, the example sensor 116, the example script generator 202, the example channel verifier 204, the example clickstream media crediter 206, the example lineup interpreter 208, the example media data comparator 210, the example watermark identifier 212, the example watermark database 214, the example signature comparator 216, the example signature database 218, the clickstream data verifier 220, the example script interpreter 302, the example transmitter interface 304, the example sensor interface 306, the example signature generator 308, the example watermark extractor 310, the example storage device 312, the example media presentation report generator 314 and/or, more generally, the example clickstream processing system 102 and/or the example media presentation data collector 112 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example remote control 114, the example sensor 116, the example script generator 202, the example channel verifier 204, the example clickstream media crediter 206, the example lineup interpreter 208, the example media data comparator 210, the example watermark identifier 212, the example watermark database 214, the example signature comparator 216, the example signature database 218, the clickstream data verifier 220, the example script interpreter 302, the example transmitter interface 304, the example sensor interface 306, the example signature generator 308, the example watermark extractor 310, the example storage device 312, and/or the example media presentation report generator 314 is/are hereby expressly defined to include a tangible computer readable storage device or storage disk such as a memory, a digital versatile disk (DVD), a compact disk (CD), a Blu-ray disk, etc. storing the software and/or firmware. Further still, the example the example clickstream processing system 102 and/or the example media presentation data collector 112 of FIGS. 1, 2, and/or 3 may include one or more elements, processes and/or devices in addition to, or instead of, those illustrated in FIGS. 1, 2, and/or 3, and/or may include more than one of any or all of the illustrated elements, processes and devices.

Flowcharts representative of example machine readable instructions for implementing the example clickstream processing system 102 and/or the example media presentation data collector 112 of FIGS. 1, 2, and/or 3 are shown in FIGS. 7, 8, 9A, 9B, and 10. In this example, the machine readable instructions comprise program(s) for execution by a processor such as the processor 1112 shown in the example processor platform 1100 discussed below in connection with FIG. 11. The program(s) may be embodied in software stored on a tangible computer readable storage medium such as a CD-ROM, a floppy disk, a hard drive, a digital versatile disk (DVD), a Blu-ray disk, or a memory associated with the processor 1112, but the entire program(s) and/or parts thereof could alternatively be executed by a device other than the processor 1112 and/or embodied in firmware or dedicated hardware. Further, although the example program(s) are described with reference to the flowcharts illustrated in FIGS. 7, 8, 9A, 9B, and/or 10, many other methods of implementing the example clickstream processing system 102 and/or the example media presentation data collector 112 may alternatively be used. For example, the order of execution of the blocks may be changed, and/or some of the blocks described may be changed, eliminated, or combined.

As mentioned above, the example processes of FIGS. 7, 8, 9A, 9B, and/or 10 may be implemented using coded instructions (e.g., computer and/or machine readable instructions)

stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 7, 8, 9A, 9B, and/or 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 7:
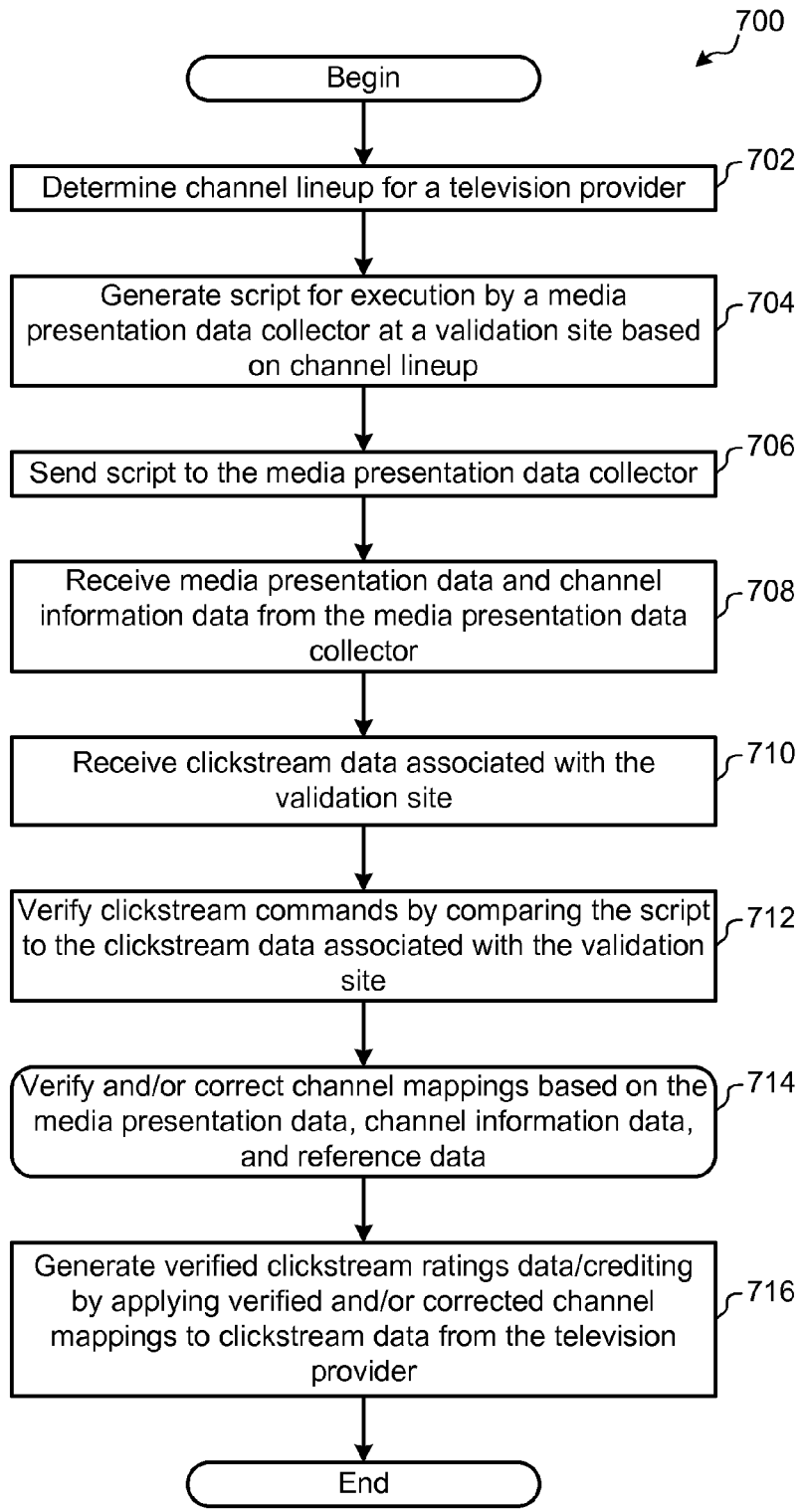
FIG. 7 is a flowchart representative of example instructions which may be executed to implement the example clickstream processing system of FIGS. 1 and/or 2 to generate ratings information from clickstream data.

FIG. 7 is a flowchart representative of example instructions 700 which may be executed to implement the example clickstream processing system 102 of FIGS. 1 and/or 2 to generate ratings information from clickstream data.

The example instructions 700 of FIG. 7 begin by determining (e.g., via the script generator 202 of FIG. 2) a channel lineup for a media provider (e.g., the media provider 104 of FIG. 1) (block 702). The channel lineup may include the set of channels (e.g., channel numbers) that may be tuned by subscribers of the media provider 104. The example script generator 202 generates a script for execution by a media presentation data collector (e.g., the media presentation data collector 112 of FIG. 1) based on the channel lineup (block 704). An example script is illustrated and described above with reference to FIG. 4. However, other formats and/or instructions may be used to generate the script.

The example script generator 202 sends the script to the media presentation data collector 112 (block 706). Blocks 702-706 may be performed during setup and configuration of the media presentation data collector 112 and/or at any time after setup and/or configuration. In some examples, the script is provided to the media presentation data collector 112 at regular intervals. In some other examples, the script generator 202 only sends an updated script to the media presentation data collector 112 when the channel lineup has changed (e.g., new channels have been added and/or channels have been removed from the lineup).

After the script is executed by the media presentation data collector 112, the example clickstream processing system 102 (e.g., the channel verifier 204 of FIG. 2) receives media presentation data and channel information from the media presentation data collector 112 (block 708). The media presentation data of the illustrated example includes watermarks, signatures, ID3 tags, and/or other metadata, and time information (e.g., timestamps). The example channel information represents the source(s) of the media from which the media presentation data (e.g., watermarks and/or signatures) were obtained. The example channel information is based on an order of tuning specified in the script (e.g., the script generated by the script generator 202).

The example clickstream data verifier 220 of FIG. 2 receives the clickstream data associated with the verification site 106 and/or the set top box 118 (block 710). For example, the clickstream data verifier 220 receives, from the media provider 104, the clickstream data for the set top box 118 that represents the time period of execution of the script. The clickstream data is representative of commands to set top boxes (e.g., commands from remote controls controlled by audience members) in associated households. Using the received clickstream data associated with the verification site 106 and/or the set top box, the example clickstream data verifier 220 verifies clickstream commands by comparing the script to the clickstream data (block 712). For example, the clickstream data verifier 220 may match up timestamps associated with data items in the clickstream data to times at which instructions in the script 400 were to be performed. The times of the instructions being performed may be explicit in the script and/or may be inferred from the script.

The example channel verifier 204 verifies and/or corrects channel mappings associated with the media provider 104 based on the media presentation data, the channel information, and reference data (block 714). For example, the channel verifier 204 may verify that the media expected to be presented on a channel (e.g., channel number) at a designated time was actually presented on that channel. Example instructions to implement block 714 are disclosed below with reference to FIG. 8.

When the channel mappings have been verified and/or corrected, the example clickstream media crediter 206 of FIG. 2 generates verified clickstream ratings data and/or crediting by applying the verified and/or corrected channel mappings to clickstream data from the media provider 104 (block 716). For example, the clickstream media crediter 206 determines a number of set top boxes and/or households that are tuned to a particular channel at a particular time or during a time slot, identifies the media being presented at the time or during the time slot using the verified and/or corrected channel mappings, and credits the identified media with the number of set top boxes and/or households. The example instructions 700 of FIG. 7 then end and/or iterate to generate clickstream-based ratings data for other areas and/or media providers.

Figure 8:
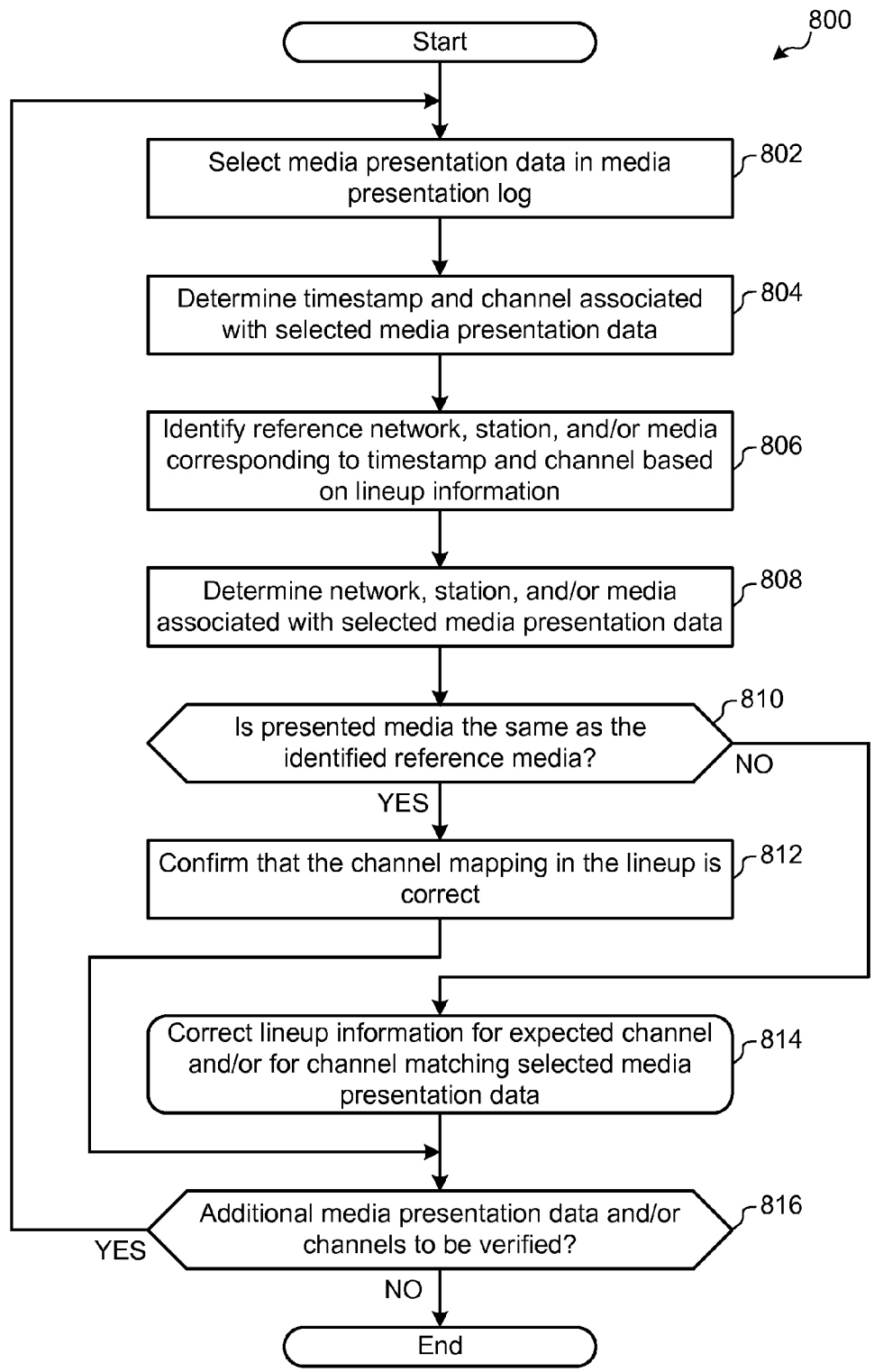
FIG. 8 is a flowchart representative of example instructions which may be executed to implement the example clickstream processing system of FIGS. 1 and/or 2 to verify channel mappings based on collected media presentation data.

FIG. 8 is a flowchart representative of example instructions which may be executed to implement the example clickstream processing system 102 of FIGS. 1 and/or 2 to verify channel mappings based on collected media presentation data. The example instructions 800 of FIG. 8 may be executed to implement block 712 of FIG. 7, and are performed after receiving media presentation data (e.g., from the media presentation data collector 112 of FIGS. 1 and/or 3).

The example lineup interpreter 208 of FIG. 2 selects media presentation data in a media presentation log (block 802). Example media presentation data includes watermarks 624, 626 and/or signature(s) 632 in the media presentation log 600 of FIG. 6. In some other examples, the media presentation data may include metadata such as ID3 tags. For purposes of discussion, the example lineup interpreter 208 selects the watermark 624 of FIG. 6.

The lineup interpreter 208 determines channel information (e.g., a timestamp and channel) associated with the selected media presentation data (block 804). For example, the lineup interpreter 208 identifies channel 1 and the time duration 12:00 P.M. to 12:02 P.M. for the watermark 624 of FIG. 6. The example media data comparator 210 of FIG. 2 identifies reference data corresponding to the determined timestamp(s) and the channel based on the lineup information (block 806). For example, the lineup interpreter 208 may identify a watermark and/or metadata (e.g., an ID3 tag including watermark data) corresponding to a network and/or station, and/or may generate a signature representative of the media (e.g., Program A 524 of FIG. 5B for the 12:00 P.M.-12:02 P.M. time slot on channel 1) presented during the identified time range and on the identified channel. Based on the media identifier (e.g., Program A 524), the example media data comparator 210 obtains reference watermarks (e.g., from the watermark database 214) and/or reference signatures (e.g., from the signature database 218) that represent the media identifier.

The example media data comparator 210 determines the network, station, and/or media associated with the selected media presentation data (block 808). For example, the watermark identifier 212 of FIG. 2 may determine a media identifier using the watermark 624. In some other examples in which the media presentation data includes signature(s), the example signature comparator 216 may determine the media identifier by looking up signature data in the signature database 218.

The example media data comparator 210 determines whether the presented media (identified in block 808) is the same as the reference media (identified in block 806) (block 810). For example, the media data comparator 210 determines whether a first media identifier determined based on the lineup information is the same as a second media identifier determined based on the media presentation data obtained from the media presentation data collector 112. In some other examples, the media data comparator 210 may compare reference watermarks and/or reference signatures determined from the lineup information to watermarks and/or signatures obtained from the media presentation data collector 112.

If the presented media is the same as the identified reference media (block 810), the example media data comparator 210 confirms that the channel mapping in the lineup is correct (block 812). For example, the media data comparator 210 may annotate the lineup information to mark the channel mapping of the media to the times and the channel as verified. On the other hand, if the presented media is not identified as being the same as the identified reference media (block 810), the example media data comparator 210 corrects the lineup information for the expected channel (e.g., the channel associated with the selected media presentation data) and/or for the channel matching the selected media presentation data (e.g., the channel, network, and/or station that is actually presenting the media associated with the media presentation data) (block 814). For example, if Program A (e.g., presented on network and/or station WABC) is shown in the lineup information as being presented on channel 1 but, in fact, is actually presented on channel 2, the example media data comparator 210 identifies which channel presented Program A (e.g., channel 2) and/or identifies which network and/or station (and/or the associated programs) are mapped to channel 1. Example instructions to implement block 814 are disclosed below with reference to FIGS. 9A and 9B.

After confirming that the channel mapping is correct (block 812) or correcting the lineup information (block 814), the example channel verifier 204 determines whether there are additional media presentation data and/or channels to be verified (block 816). If there are additional media presentation data and/or channels to be verified (block 816), control returns to block 802 to select other media presentation data from the media presentation log 600. When there are no more media presentation data and no more channels to be verified (block 816), the example instructions 800 of FIG. 8 end, and control returns to block 716 of FIG. 7.

Figure 9A:
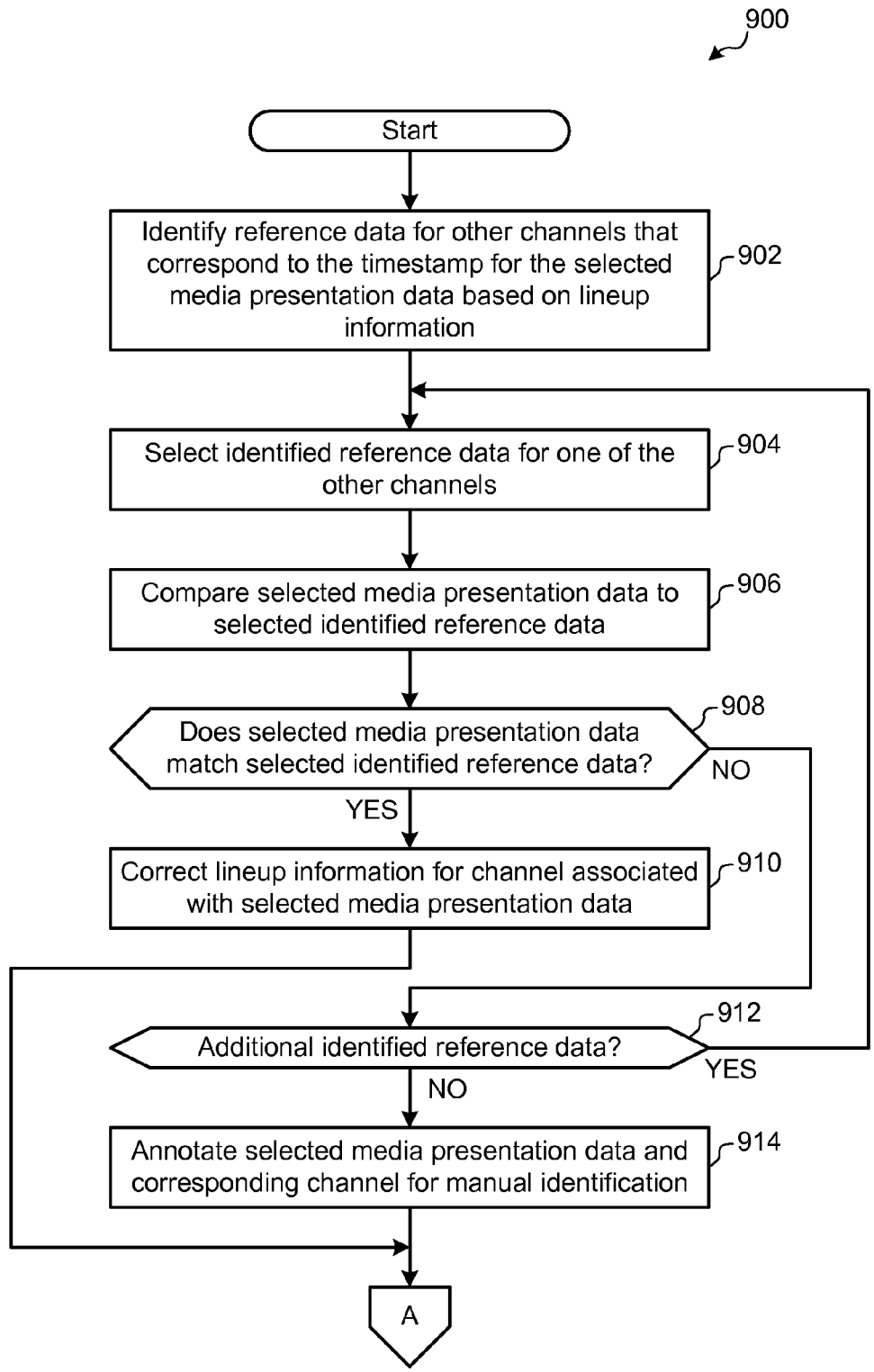
FIGS. 9A and 9B are a flowchart representative of example instructions which may be executed to implement the example clickstream processing system of FIGS. 1 and/or 2 to correct lineup information.
Figure 9B:
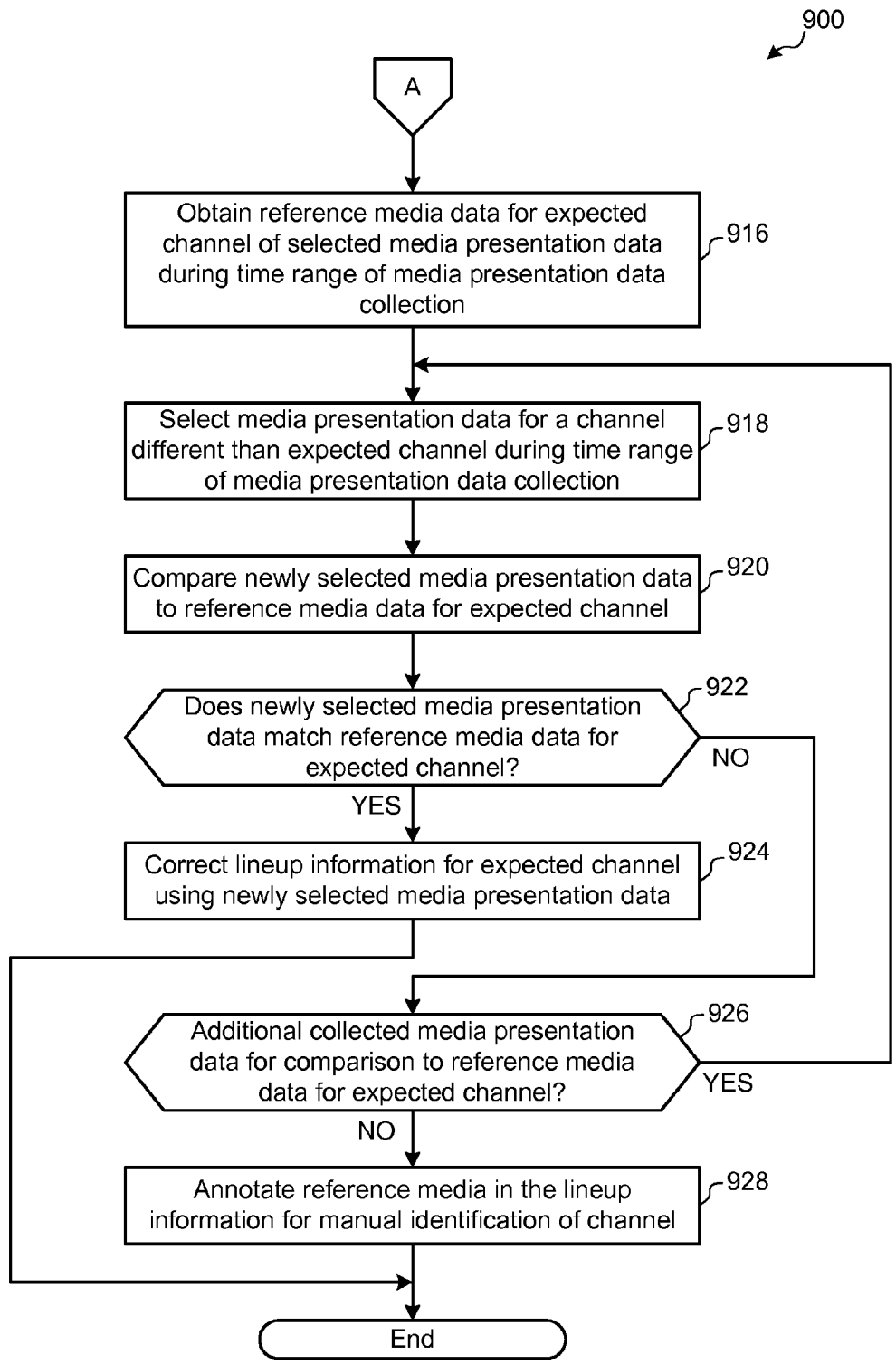

FIGS. 9A and 9B illustrate a flowchart representative of example instructions 900 which may be executed to implement the example clickstream processing system 102 of FIGS. 1 and/or 2 to correct lineup information. The example blocks 902-914 of FIG. 9A may be executed to correct lineup information for a channel associated with media presentation data (e.g., a channel specified in a script and/or annotated with watermarks and/or signatures obtained from the media presentation data collector 112 of FIG. 1). The example blocks 916-928 may be executed to correct lineup information for a network and/or station that is mapped to different channel than indicated in the lineup information (e.g., to determine the channel to which a network and/or station is assigned, different from what is indicated in the lineup information). While the example instructions 900 are shown and described as a process to correct lineup information that includes blocks 902-928, the example blocks 902-914 and the example blocks 916-928 may be split into and/or implemented as different processes.

With reference to FIG. 9A, the example instructions 900 begin with selected media presentation data (e.g., selected in block 802 of FIG. 8). For clarity of description, the example instructions will be described with reference to the example lineup information 500 of FIG. 5A and the example media presentation log 600 of FIG. 6, in which the watermark 624 is the selected media presentation data and, thus, the associated channel is channel 1 and the associated timestamp(s) include 12:00 P.M. to 12:02 P.M.

The example lineup interpreter 208 and/or the media data comparator 210 of FIG. 2 identify reference data for channels, other than the channel associated with the selected media presentation data (e.g., channel 1), that correspond to the timestamp (e.g., 12:00 P.M. to 12:02 P.M.) for the selected media presentation data (e.g., watermark 624) based on the lineup information 500 (block 902). For example, the lineup interpreter 208 may identify Program B 526, Program E 528, Program I 530, Program K 532, and/or other programs on additional channels. The identified programs 526-532 are presented at a same time (e.g., 12:00 P.M.-12:02 P.M.) on channels 504-510 different than the channel 502 associated with the selected media presentation data (e.g., watermark 624). The example media data comparator 210 of FIG. 2 obtains reference data (e.g., reference signatures, reference watermarks) associated with the identified programs 526-532 based on, for example, the media identifiers provided by the lineup interpreter 208.

The example media data comparator 210 selects identified reference data for one of the other channels (block 904). For example, the media data comparator 210 selects watermarks and/or signatures associated with Program B 526. The media data comparator 210 compares the selected media presentation data to selected identified reference data (block 906). For example, the watermark identifier 212 may determine whether reference watermarks associated with Program B 526 match watermarks included in the selected media presentation data. Additionally or alternatively, the example signature comparator 216 may determine whether signatures representative of Program B 526 sufficiently match signatures included in the selected media presentation data.

If the selected media presentation data matches the selected reference data (block 908), the example channel verifier 204 corrects the lineup information (e.g., the lineup information 500) for the channel associated with the selected media presentation data (block 910). For example, the channel verifier 204 changes the lineup information 500 of FIG.

5A and/or the program schedule 514 of FIG. 5B such that network/station 512 and/or the Program B 526 and the other programs presented on the same channel as Program B 526 (e.g., Program C, Program D, etc.) are associated with the channel 502 of the selected media presentation data (e.g., channel 1).

On the other hand, if the selected media presentation data does not match the selected reference data (block 908), the example media data comparator 210 determines whether there is additional reference data (e.g., for additional channels) for comparison to the media presentation data (block 912). If there is additional reference data for comparison (block 912), control returns to block 904 to select reference data corresponding to another channel 504-510. If none of the reference data for the channels 504-510 matches the selected media presentation data and there are no additional channels (block 912), the example channel verifier 204 annotates or marks the selected media presentation data and the corresponding channel (e.g., channel 1) for manual identification (block 914). The annotation may prompt a human reviewer to determine a channel, network, and/or station and/or set of programming (e.g., from the lineup information and/or from another source).

After correcting the lineup information (block 910) or after annotating the selected media presentation data (block 914), the example channel verifier 204 advances to blocks 916-928 of FIG. 9B to correct lineup information for a network and/or station, and/or media that is mapped to a different channel than is indicated in the lineup information. The example channel verifier 204 obtains reference media data corresponding to the channel (e.g., channel 1) and the time range (e.g., 12:00 P.M. to 12:02 P.M.) associated with the selected media presentation data (e.g., Program A 524) (block 916). For example, the lineup interpreter 208 and/or the media data comparator 210 may obtain the reference data identified in block 808 of FIG. 8.

The example channel verifier 204 selects media presentation data for a channel (e.g., channel 3 606) different than the expected channel (e.g., channel 1) during the time range (e.g., 12:00 P.M.-12:30 P.M. time slot) of the media presentation data collection (block 918). For example, the media data comparator 210 may select the watermark 3 628 associated with channel 3 and collected between 12:04 P.M. and 12:06 P.M. The media data comparator 210 (e.g., via the watermark identifier 212 and/or the signature comparator 216) compares the newly selected media presentation data (e.g., watermark 3 628) to the reference media data for the expected channel (e.g., channel 1).

If the newly selected media presentation data (e.g., watermark 3 628) matches reference media data for the expected channel (e.g., channel 1) (block 922), the example channel verifier 204 corrects the lineup information for the expected channel (e.g., channel 1) using the newly selected media presentation data (e.g., watermark 3 628) (block 924).

On the other hand, if the newly selected media presentation data (e.g., watermark 3 628) does not match the reference media data for the expected channel (e.g., channel 1) (block 922), the example channel verifier 204 determines whether there is additional collected media presentation data (e.g., watermark 4 630) for comparison to the reference media data for the expected channel (e.g., channel 1) (block 926). If there is additional collected media presentation data (block 926), control returns to block 918 to select next media presentation data. If none of the collected media presentation data matches the reference media data during the media presentation data collection period (block 922) and there is no more collected media presentation data for comparison (block 926), the example channel verifier 204 annotates or marks the reference media in the lineup information for manual identification of a channel on which the reference media was presented (block 928).

After correcting the lineup information (block 924) or after annotating the reference media (block 928), the example instructions 900 end and control returns to block 816 of FIG. 8. The example instructions 900 may be executed again in a subsequent iteration of block 814 for different selected media presentation data.

Figure 10:
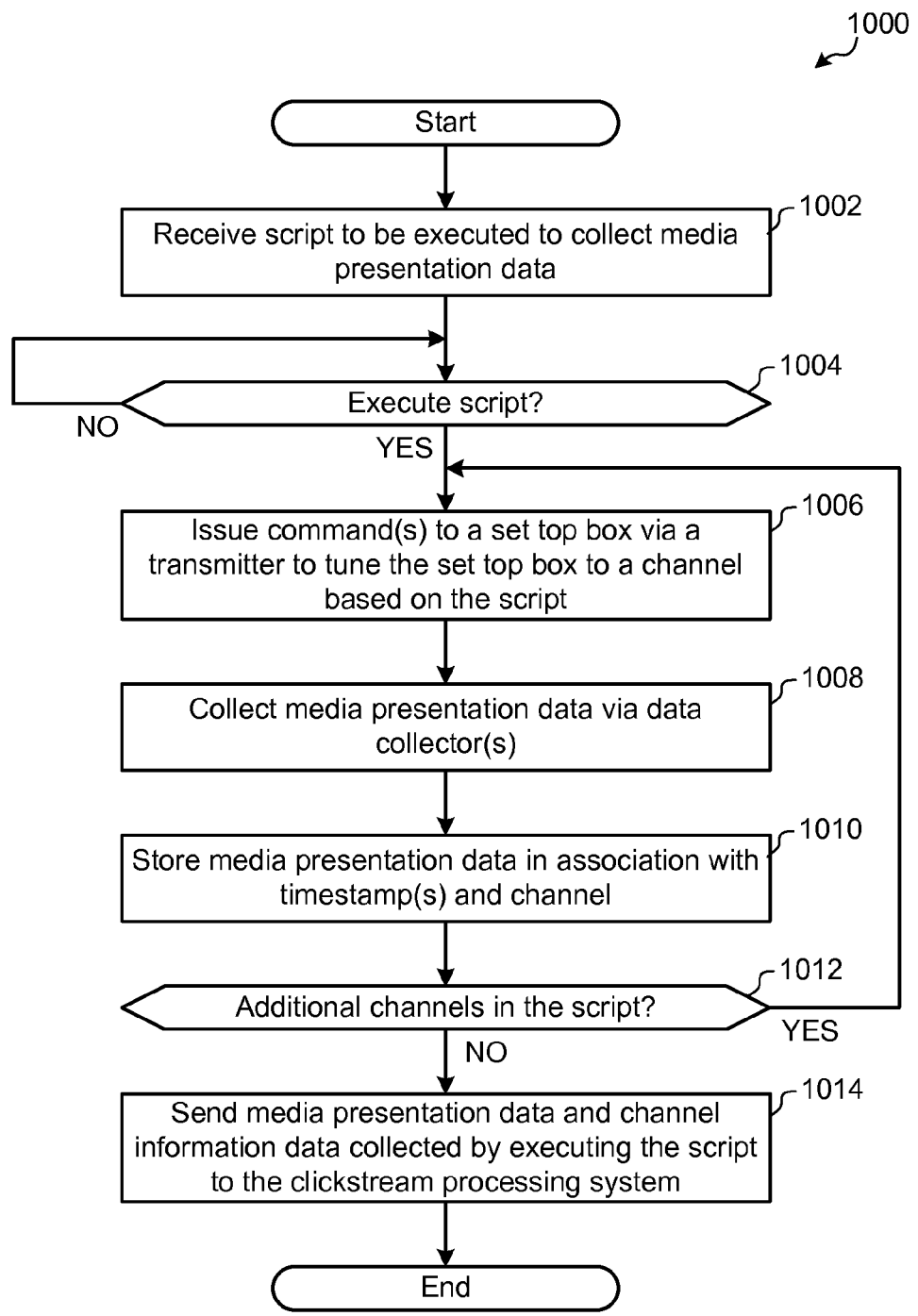
FIG. 10 is a flowchart representative of example instructions which may be executed to implement the example media presentation data collector of FIGS. 1 and/or 3 to collect media presentation data.

FIG. 10 is a flowchart representative of example instructions 1000 which may be executed to implement the example media presentation data collector 112 of FIGS. 1 and/or 3 to collect media presentation data. The example instructions 1000 may additionally or alternatively implement execution of a script such as the example script 400 of FIG. 4.

The example script interpreter 302 of FIG. 3 receipts the script to be executed to collect media presentation data (block 1002). The script may be the example script 400 of FIG. 4 and/or another script generated by the script generator 202 of FIG. 2 to verify channel lineup information for a media provider 104 and/or to credit media presentations with audiences based on clickstream data. The script interpreter 302 determines whether the script is to be executed (block 1004). For example, the script 400 may include instructions indicating a time at which the script 400 is to be executed. Additionally or alternatively, the script interpreter 302 may be scheduled to execute the script 400 at a predetermined time and/or on a predetermined schedule. If the script interpreter 302 determines that the script 400 is not to be executed (block 1004), the script interpreter 302 loops to block 1004 to wait until the script 400 is to be executed.

When the script 400 is to be executed (block 1004), the example script interpreter 302 issues command(s) to a set top box (e.g., the set top box 118 of FIG. 1) via a transmitter (e.g., the remote control 114, the transmitter interface 304 of FIG. 3) to tune the set top box 118 to a channel based on the script 400 (block 1006). For example, the script interpreter 302 may execute lines 418, lines 426, 428, and/or line 438 to cause the transmitter interface 304 and/or the remote control 114 to tune the set top box 118 to a channel.

The example sensor interface 306, the example signature generator 308, and/or the watermark extractor 310 collect and/or store media presentation data (block 1008). For example, the signature generator 308 generates signatures and/or the watermark extractor 310 extracts watermarks from media signals and/or data collected by the sensor interface 306 of FIG. 3 and/or the sensor 116 of FIG. 1. The signature generator 308 and/or the watermark extractor 310 store the media presentation data (e.g., the signature(s) and/or watermark(s)) in association with corresponding timestamp(s) (e.g., generated by the sensor interface 306 when collecting the media signals and/or data) and the channel information (e.g., the channel to which the set top box 118 is tuned, determined based on the script) (block 1010). For example, the signature generator 308 and/or the watermark extractor 310 may store the media presentation data in the storage device 312 in an array, a log such as the media presentation log 600 of FIG. 6, and/or any other data structure.

The example script interpreter 302 determines whether there are additional channels to be tuned in the script 400 (block 1012). If there are additional channels (block 1012), control returns to block 1006 to issue another command to tune the set top box 118 to another channel. If there are no more channels to be tuned (block 1012), the example media presentation report generator 314 sends the media presentation data and channel information collected by executing the script 400 to the clickstream processing system 102 (block 1014). The example media presentation data may include, for example, generated signatures and/or extracted watermarks, as well as timestamps of the times at which the media signals, from which the signatures and watermarks were generated, were collected and the channels the set top box 118 was tuned to at the time of collection of the media signals. The example instructions 1000 may then end. In some examples, the instructions 1000 iterate to collect media presentation data in accordance with another script.

Figure 11:
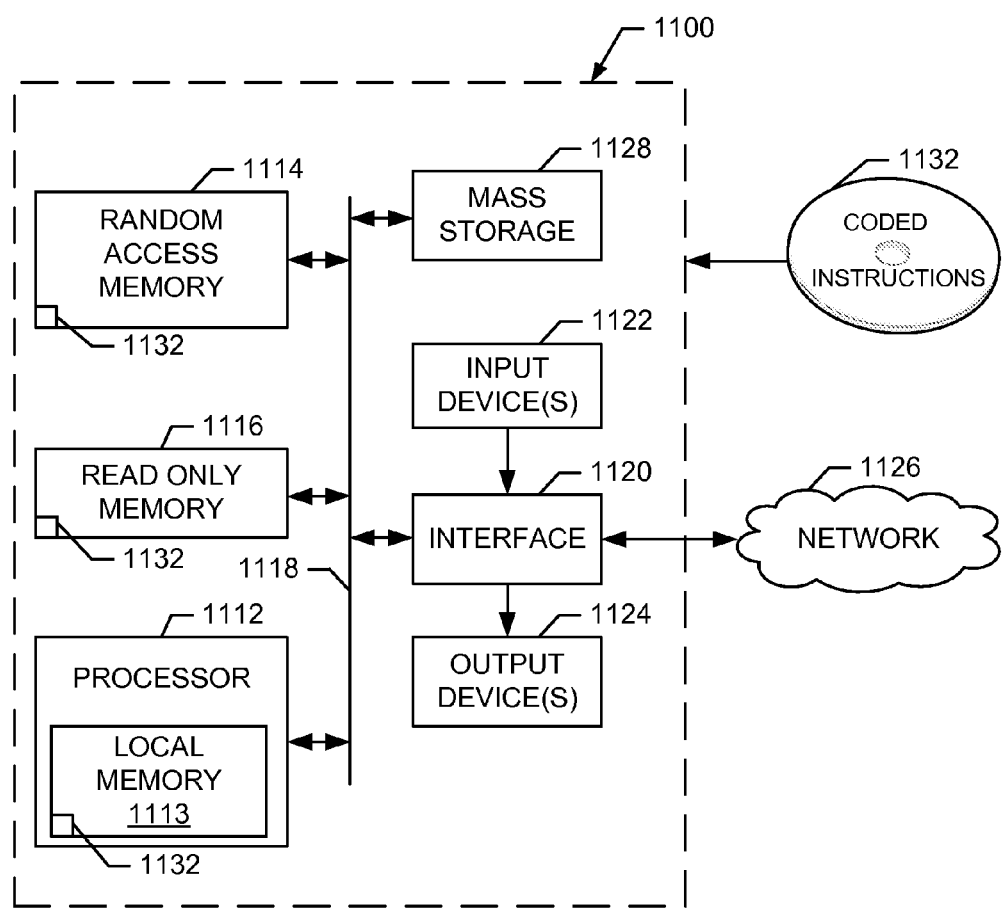
FIG. 11 is a block diagram of an example processor platform capable of executing the instructions of FIGS. 7, 8, 9A, 9B, and/or 10 to implement the clickstream processing system and/or the media presentation data collector of FIGS. 1, 2, and/or 3.

FIG. 11 is a block diagram of an example processor platform 1100 capable of executing the instructions of FIGS. 7, 8, 9A, 9B, and/or 10 to implement the clickstream processing system 102 and/or the media presentation data collector 112 of FIGS. 1, 2, and/or 3. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 7, 8, 9A, 9B, and/or 10 may be stored in the mass storage device 1128, in the volatile memory 1114, in the non-volatile memory 1116, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
    comparing, by executing an instruction with a processor, media presentation data representative of media output by a first set top box to reference data corresponding to a first station to determine whether the media presentation data corresponds to the reference data, the media presentation data collected while the first set top box was tuned to a first channel number;
    when the media presentation data does not correspond to the reference data, determining a second station that corresponds to the media presentation data;
    correcting, by executing an instruction with the processor, a first channel map that relates the first channel number to the first station based on channel lineup information for the first set top box, the correcting including relating the first channel number to the second station to create a second channel map, the channel lineup information corresponding to a geographic area in which the first set top box is located; and
    correcting, by executing an instruction with the processor, clickstream data that corresponds to the first channel map using the second channel map, the clickstream data representing commands to other set top boxes at designated households in the geographic area.

2. The method of claim 1, wherein the media presentation data includes a first watermark extracted from the media, the reference data includes a second watermark corresponding to the first station, and the method further includes determining the reference data based on the first channel map by A) looking up the first station in the first channel map in a database and B) setting the second watermark as the reference data when the second watermark corresponds to the first station in the database.

3. The method of claim 2, wherein the determining of the second station includes looking up the first watermark in the database to identify the second station as corresponding to the first watermark in the database.

4. The method of claim 2, further including determining a second channel number that corresponds to the first station by:
    comparing the second watermark to additional watermarks in the media presentation data to determine a third watermark that matches the second watermark;
    determining a time at which the third watermark was collected; and
    determining the second channel number as the channel to which the first set top box was tuned at the time based on a script used to control tuning of the first set top box to a set of channels including the first and second channels.

5. The method of claim 2, wherein the media presentation data includes an ID3 tag.

6. The method of claim 5, wherein the ID3 tag contains the first watermark.

7. The method of claim 1, wherein the media presentation data includes first signatures representative of the media, the reference data includes second signatures representative of reference media scheduled to be presented on the first station according to a program schedule, and the method further includes:
looking up the first station in the program schedule in a database based on times at which the first signatures were generated; and
setting the second signatures as the reference data when the second signatures correspond to the first station and to the times at which the first signatures were generated according to the program schedule.

8. The method of claim 7, wherein the determining of the second station includes:
identifying third signatures in the database that match the first signatures;
determining second reference media corresponding to the third signatures based on the database; and
determining the second station that was scheduled to present the second reference media at the times at which the first signatures were generated based on the program schedule.

9. The method of claim 7, further including determining a second channel number that corresponds to the first station by:
comparing the second signatures to third signatures in the media presentation data, the third signatures generated when the set top box was tuned to the second channel number;
when the second signatures match the third signatures, determining a time at which the third signatures were generated from media output by the first set top box; and
determining the second channel number as the channel to which the first set top box was tuned at the time the third signatures were generated based on a script used to control tuning of the first set top box to a set of channels including the first and second channels.

10. The method of claim 1, wherein the media presentation data is generated from audio output from a media presentation device, the media presentation device outputting the audio based on the media output by the first set top box.

11. The method of claim 1, wherein the media presentation data is generated from ID3 tags associated with the media output by the first set top box.

12. The method of claim 1, wherein the media presentation data includes at least one of a signature representative of the media output by the set top box, a code embedded in the media output by the set top box, or metadata transmitted with the media.

13. An apparatus, comprising:
a script generator to generate a script including instructions that, when executed, cause a computing device to issue a sequence of commands to a first set top box;
a media data comparator to:
compare media presentation data representative of media output by the first set top box to reference data corresponding to a first station to determine whether the media presentation data corresponds to the reference data, the media presentation data collected while the first set top box was tuned to a first channel number;
when the media presentation data does not correspond to the reference data, determine a second station that corresponds to the media presentation data; and
correct a first channel map that relates the first channel number to the first station for the first set top box by relating the first channel number to the second station to create a second channel map; and
a clickstream media crediter to correct clickstream data using the second channel map, the clickstream data representing commands to second set top boxes at households in a geographic area corresponding to the first set top box.

14. The apparatus of claim 13, further including a lineup interpreter to identify the first channel map based on channel lineup information for the first set top box, the channel lineup information corresponding to a geographic area in which the first set top box is located.

15. The apparatus of claim 13, wherein the media presentation data includes a first watermark extracted from the media, the reference data includes a second watermark corresponding to the first station, and the apparatus further includes a watermark identifier to:
look up the first station in the first channel map in a database;
determine the reference data based on the first channel map; and
set the second watermark as the reference data based on the second watermark corresponding to the first station in the database.

16. The apparatus of claim 15, wherein the watermark identifier is to, when the media presentation data does not correspond to the reference data:
look up the first watermark in the database to identify the second station as corresponding to the first watermark in the database; and
determine a second channel number that corresponds to the first station by:
comparing the second watermark to other watermarks in the media presentation data to determine a third watermark that matches the second watermark;
determining a time at which the third watermark was collected from media output by the first set top box; and
determining the second channel number as the channel to which the first set top box was tuned at the time based on the script.

17. The apparatus of claim 13, wherein the media presentation data includes first signatures representative of the media, the reference data includes second signatures representative of reference media scheduled to be presented on the first station according to a program schedule, and the apparatus further includes a signature comparator to:
look up the first station in the program schedule in a database based on times at which the first signatures were generated; and
set the second signatures as the reference data when the second signatures correspond to the first station and to the times at which the first signatures were generated according to the program schedule.

18. The apparatus of claim 17, wherein the signature comparator is to, when the media presentation data does not correspond to the reference data:

determine the second station by:
  identifying third signatures in the database that match the first signatures;
  determining second reference media corresponding to the third signatures based on the database; and
  determining the second station that was scheduled to present the second reference media at the times at which the first signatures were generated based on the program schedule; and
determine a second channel number that corresponds to the first station by:
  comparing the second signatures to fourth signatures in the media presentation data, the fourth signatures generated when the set top box was tuned to the second channel number;
  when the second signatures match the fourth signatures, determining a generation time at which the fourth signatures were generated from media output by the first set top box; and
  determining the second channel number as the channel to which the first set top box was tuned at the generation time based on the script.

19. The apparatus of claim 13, further including a clickstream data verifier to identify a discrepancy in the clickstream data by:
  selecting a first command identified in the clickstream data based on a time at which the first command occurred;
  selecting a second command programmed in the script based on a time the second command was performed; and
  comparing the first command to the second command.

20. A tangible computer readable storage medium comprising computer readable instructions which, when executed, cause a logic circuit to at least:
  determine a first channel map that relates a first channel number to a first station based on channel lineup information for a first set top box controlled by a computing device based on a script, the channel lineup information corresponding to a geographic area in which the first set top box is located;
  compare media presentation data representative of media output by the first set top box to reference data corresponding to the first station to determine whether the media presentation data corresponds to the reference data, the media presentation data collected while the first set top box was tuned to the first channel number;
  when the media presentation data does not correspond to the reference data, determine a second station that corresponds to the media presentation data;
  correct the first channel map by relating the first channel number to the second station to create a second channel map; and
  correct clickstream data that corresponds to the first channel map using the second channel map, the clickstream data representing commands to second set top boxes at designated households in the geographic area.

21. The storage medium of claim 20, wherein the media presentation data includes a first watermark extracted from the media, the reference data includes a second watermark corresponding to the first station, and the instructions are further to cause the logic circuit to determine the reference data based on the first channel map by A) looking up the first station in the first channel map in a database and B) setting the second watermark as the reference data based on the second watermark corresponding to the first station in the database.

22. The storage medium of claim 21, wherein the instructions are to cause the logic circuit to determine the second station by looking up the first watermark in the database to identify the second station as corresponding to the first watermark in the database.

23. The storage medium of claim 21, wherein the instructions are further to cause the logic circuit to determine a second channel number that corresponds to the first station by:
  comparing the second watermark to additional watermarks in the media presentation data to determine a third watermark that matches the second watermark;
  determining a time at which the third watermark was collected; and
  determining the second channel number as the channel to which the first set top box was tuned at the time based on the script.

24. The storage medium of claim 20, wherein the media presentation data includes first signatures representative of the media, the reference data includes second signatures representative of reference media scheduled to be presented on the first station according to a program schedule, and the instructions are further to cause the logic circuit to:
  look up the first station in the program schedule in a database based on times at which the first signatures were generated; and
  set the second signatures as the reference data when the second signatures correspond to the first station and to the times at which the first signatures were generated according to the program schedule.

25. The storage medium of claim 24, wherein the instructions are to cause the logic circuit to determine the second station by:
  identifying third signatures in the database that match the first signatures;
  determining second reference media corresponding to the third signatures based on the database; and
  determining the second station that was scheduled to present the second reference media at the times at which the first signatures were generated based on the program schedule.

26. The storage medium of claim 24, wherein the instructions are further to cause the logic circuit to determine a second channel number that corresponds to the first station by:
  comparing the second signatures to third signatures in the media presentation data, the third signatures generated when the set top box was tuned to the second channel number;
  when the second signatures match the third signatures, determining a time at which the third signatures were generated from media output by the first set top box; and
  determining the second channel number as the channel to which the first set top box was tuned at the time based on the script.

27. The storage medium of claim 20, wherein the media presentation data is generated from audio output from a media presentation device, the media presentation device outputting the audio based on the media output by the first set top box.

28. The storage medium of claim 20, wherein the media presentation data includes at least one of a signature representative of the media output by the set top box or a code embedded in the media output by the set top box.

* * * * *